US011206508B2

(12) United States Patent
Singh et al.

(10) Patent No.: US 11,206,508 B2
(45) Date of Patent: Dec. 21, 2021

(54) ELECTRONIC DEVICE AND METHOD FOR MANAGING OPERATION THEREOF WHILE OPERATING VEHICLE

(71) Applicant: SAMSUNG ELECTRONICS CO., LTD., Suwon-si (KR)

(72) Inventors: Amitoj Singh, New Delhi (IN); Ashish Bansal, Gurgaon (IN); Varad Arya, Uttar Pradesh (IN); Ishani Ghosh, New Delhi (IN); Manoj Kumar, New Delhi (IN); Sanket Magarkar, Maharashtra (IN); Tasleem Arif, Noida (IN); Anupam Bhardwaj, New Delhi (IN); Saurabh Deb, New Delhi (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/424,113

(22) Filed: Feb. 3, 2017

(65) Prior Publication Data
US 2017/0223168 A1 Aug. 3, 2017

(30) Foreign Application Priority Data

Feb. 3, 2016 (IN) .............................. 201611003876
Feb. 3, 2016 (IN) .............................. 201611003877
Sep. 8, 2016 (IN) .............................. 201611003876

(51) Int. Cl.
*H04W 4/02* (2018.01)
*H04W 4/12* (2009.01)
(Continued)

(52) U.S. Cl.
CPC ....... *H04W 4/027* (2013.01); *H04M 1/72454* (2021.01); *H04M 3/42348* (2013.01);
(Continued)

(58) Field of Classification Search
CPC ......... H04W 4/027; H04W 4/06; H04W 4/12; H04W 4/046; H04W 48/04; H04M 1/64;
(Continued)

(56) References Cited

U.S. PATENT DOCUMENTS 6,301,338 B1    10/2001   Makela et al.
8,527,013 B2    9/2013    Guba et al.
(Continued)

FOREIGN PATENT DOCUMENTS

CN    101902515 A    12/2010
CN    102843471 A    12/2012
(Continued)

OTHER PUBLICATIONS

Microsoft Devices Team; Stay safe with Windows Phone Driving Mode (https://blogs.windows.com/devices/2014/01/21/stay-safe-windows-phone-drivingmode/); Jan. 21, 2014.
(Continued)

*Primary Examiner* — Margaret G Mastrodonato
(74) *Attorney, Agent, or Firm* — Sughrue Mion, PLLC

(57) ABSTRACT

An electronic device includes a communication interface configured to receive a call from another electronic device, a sensor to sense a motion speed of the electronic device, and a processor configured to provide, to a server, a status of the electronic device based on the motion speed for notifying the another electronic device of the status, determine a type of the call according to an input received from the another electronic device after providing the status, and control to provide a notification related to the call in the electronic device based on the type of the call.

23 Claims, 51 Drawing Sheets

(51) Int. Cl.
| | |
|---|---|
| *H04M 3/42* | (2006.01) |
| *H04M 3/436* | (2006.01) |
| *H04M 1/72454* | (2021.01) |
| *H04W 4/48* | (2018.01) |
| *H04M 1/64* | (2006.01) |

(52) U.S. Cl.
CPC .......... *H04M 3/4365* (2013.01); *H04W 4/12* (2013.01); *H04M 1/64* (2013.01); *H04W 4/48* (2018.02)

(58) Field of Classification Search
CPC ......... H04M 1/72569; H04M 1/72577; H04M 2250/12
See application file for complete search history.

(56) References Cited

U.S. PATENT DOCUMENTS

| | | | |
|---|---|---|---|
| 8,571,538 B2 | 10/2013 | Sprigg et al. | |
| 8,660,543 B2 | 2/2014 | Turner et al. | |
| 9,146,124 B2 | 9/2015 | Parada et al. | |
| 9,185,526 B2 | 11/2015 | Guba et al. | |
| 9,204,258 B2 | 12/2015 | Chen et al. | |
| 9,509,836 B2 | 11/2016 | Wu | |
| 9,742,892 B2 | 8/2017 | Wu | |
| 2005/0282559 A1 | 12/2005 | Erskine et al. | |
| 2008/0139183 A1 | 6/2008 | Keohane et al. | |
| 2009/0149153 A1 | 6/2009 | Lee | |
| 2009/0163243 A1* | 6/2009 | Barbera | H04M 1/72577 455/557 |
| 2009/0252303 A1* | 10/2009 | Agarwal | H04M 19/041 379/37 |
| 2010/0198453 A1* | 8/2010 | Dorogusker | G06F 1/1626 701/31.4 |
| 2011/0009107 A1 | 1/2011 | Guba et al. | |
| 2011/0151842 A1* | 6/2011 | Olincy | H04M 3/42348 455/414.1 |
| 2011/0187547 A1 | 8/2011 | Kweon | |
| 2011/0269441 A1* | 11/2011 | Silver | H04W 4/027 455/418 |
| 2012/0041633 A1* | 2/2012 | Schunder | B60K 35/00 701/29.2 |
| 2012/0077438 A1* | 3/2012 | Jung | A42B 3/30 455/41.2 |
| 2013/0137404 A1* | 5/2013 | Kuo | H04W 4/046 455/413 |
| 2013/0260725 A1* | 10/2013 | Sharma | H04W 4/027 455/414.1 |
| 2013/0303106 A1* | 11/2013 | Martin | H04W 4/027 455/404.2 |
| 2013/0316737 A1 | 11/2013 | Guba et al. | |
| 2014/0167986 A1* | 6/2014 | Parada | G01C 21/365 340/905 |
| 2014/0256305 A1* | 9/2014 | Ginis | H04W 4/02 455/418 |
| 2015/0011203 A1 | 1/2015 | Schrader et al. | |
| 2015/0181414 A1 | 6/2015 | Bretscher et al. | |
| 2015/0229759 A1 | 8/2015 | Wu | |
| 2015/0244854 A1* | 8/2015 | Babel | H04M 1/66 455/414.1 |
| 2015/0341493 A1 | 11/2015 | Haley | |
| 2015/0373666 A1* | 12/2015 | Malahy | H04W 68/00 455/414.1 |
| 2016/0088146 A1* | 3/2016 | Ying | H04W 4/027 455/550.1 |
| 2016/0134744 A1* | 5/2016 | de la Fuente Sanchez | H04W 4/80 455/418 |
| 2016/0191694 A1* | 6/2016 | Kim | H04M 1/72527 455/418 |
| 2017/0048369 A1 | 2/2017 | Wu | |

FOREIGN PATENT DOCUMENTS

| | | |
|---|---|---|
| CN | 103313343 A | 9/2013 |
| CN | 103701979 A | 4/2014 |
| CN | 104168368 A | 11/2014 |
| CN | 104837125 A | 8/2015 |
| CN | 104956182 A | 9/2015 |
| EP | 2 815 927 A1 | 12/2014 |
| EP | 2 472 839 B1 | 12/2015 |
| JP | 2012-526497 A | 10/2012 |
| JP | 2013-61728 A | 4/2013 |
| KR | 10-1128200 B1 | 3/2012 |
| KR | 10-1536444 B1 | 7/2015 |
| WO | 2009064132 A2 | 5/2009 |
| WO | 2009105125 A1 | 8/2009 |

OTHER PUBLICATIONS

Microsoft; Use Driving Mode (http://www.windowsphone.com/en-us/how-to/wp8/basics/use-driving-mode); May 17, 2016.
Microsoft; Use Driving Mode (https://support.microsoft.com/en-in/help/11575/windows-phone-use-driving-mode); May 17, 2016.
Anick Jesdanun; Windows Phone update has safe-driving mode, support for larger HD devices (http://www.nbcnews.com/technology/windows-phone-update-has-driving-mode-supportlarger-hd-devices-8C11382277); Oct. 14, 2013.
International Search Report and Written Opinion dated May 19, 2017 issued by the International Searching Authority in counterpart International Application PCT/KR2017/001211 (PCT/ISA210/237).
Communication dated Sep. 27, 2018, issued by the European Patent Office in counterpart European Application No. 17747793.2.
Communication dated Jan. 2, 2019, issued by the European Patent Office in counterpart European Application No. 17747793.2.
Communication dated Jan. 19, 2020 issued by the State Intellectual Property Office of P.R. China in counterpart Chinese Application No. 201780009538.0.
Communication dated May 7, 2020 issued by the European Intellectual Property Office in counterpart European Application No. 17 747 793.2.
Communication dated Sep. 30, 2020, issued by the State Intellectual Property Office of People's Republic of China in Chinese Application No. 201780009538.0.
Communication dated Apr. 6, 2021, from National Intellectual Property Administration of P.R. China in Chinese Application No. 201780009538.0.
Communication dated Jan. 15, 2020 by the India Intellectual Property Office in Indian Patent Application No. 201611003876, 6 pages total.
Communication dated Sep. 15, 2021, issued by the China National Intellectual Property Administration in Chinese Application No. 201780009538.0.
Communication dated Oct. 1, 2021, issued by the European Patent Office in European Application No. 17747793.2.

* cited by examiner

Motorcycle mode "ON"

Pair with a helmet when the motorcycle mode is enabled

Smart Helmet

User receives a voice notification in the smart helmet, "Contact-A calling. Halt to accept incoming call".

User receives a call from a white list contact. All other calls are filtered for urgent calls Motorcycle mode "Enabled"

Pair with a wearable device when the motorcycle mode is enabled

Wearable device

Incoming call...

User receives a call from a white list contact. All other calls are filtered for urgent calls

100

ELECTRONIC DEVICE AND METHOD FOR MANAGING OPERATION THEREOF WHILE OPERATING VEHICLE

CROSS-REFERENCE TO RELATED APPLICATIONS

This application claims priority from Indian Provisional Patent Application Nos. 201611003876 and 201611003877, filed on Feb. 3, 2016, and from Indian Patent Application No. 201611003876, filed on Sep. 8, 2016, in the Indian Intellectual Property Office, the disclosures of which are incorporated herein by reference in their entireties.

BACKGROUND

1. Field

Apparatuses and methods consistent with exemplary embodiments relate to electronic devices and, more particularly, to a mobile device and method thereof for managing at least one operation while operating a vehicle.

2. Description of Related Art

Generally, addressing safety concerns and handling communication of commuters is of most importance in emerging markets. Mobile devices may cause anxiety of users, who, for example, ride a motorcycle, thus causing distraction. Further, operating the mobile devices while riding the motorcycle may be dangerous and fatal. The users feel apprehensive about missing any incoming calls and further the users cannot distinguish between urgent, non-urgent, and unwanted calls.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a user experience that can induce safe driving to a user by classifying an urgent event among events received from a user who uses an electronic device while riding on a vehicle and providing the same to the electronic device.

According to an aspect of an exemplary embodiment, there is provided a method of controlling an electronic device, the method including: receiving a call from another electronic device, sensing, by a sensor, a motion speed of the electronic device, providing, to a server, a status of the electronic device based on the motion speed for notifying the another electronic device of the status, determine a type of the call according to an input received from the another electronic device after providing the status, and control to provide a notification related to the call in the electronic device based on the type of the call.

According to an aspect of another exemplary embodiment, there is a provided an electronic device including: a communication interface configured to receive a call from another electronic device, a sensor to sense a motion speed of the electronic device, a processor configured to provide, to a server, a status of the electronic device based on the motion speed for notifying the another electronic device of the status, determine a type of the call according to an input received from the another electronic device after providing the status, and control to provide a notification related to the call in the electronic device based on the type of the call.

According to exemplary embodiments, the electronic device and the controlling method thereof provide a variety of user experiences depending on the context of the electronic device while the user of the electronic device is riding on the vehicle, and thereby the safety of the user may be improved.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
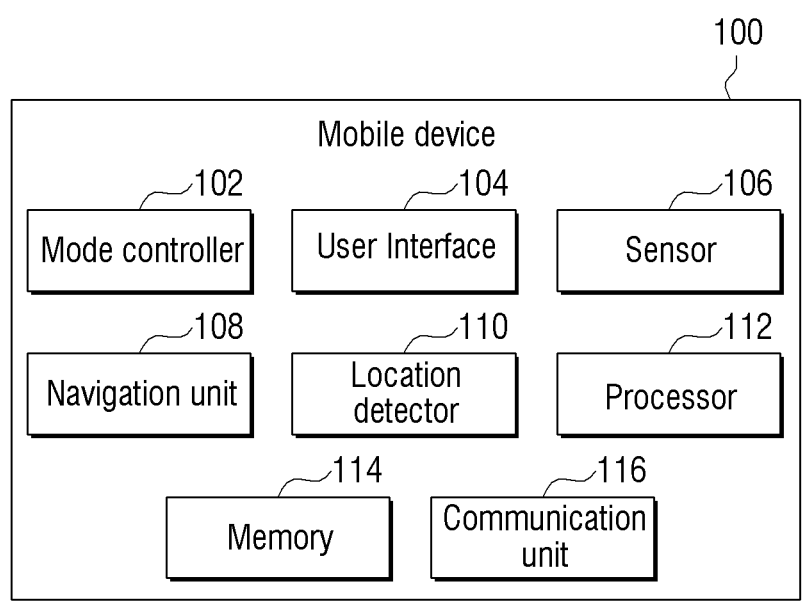
FIG. 1 illustrates a block diagram of a mobile device, according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The terms used herein are selected from the general terms that are widely used at present and in consideration of the functions of exemplary embodiments, but at the same time, the terms may vary depending on the intent of those skilled in the art or the precedents, or by the emergence of new technologies. Further, certain terms may be arbitrarily chosen, in which case the corresponding meaning will be described in detail. Accordingly, the terms used herein will be defined based on the names of the terms, but based on the meanings of the terms and the context throughout the description.

The exemplary embodiments may have a variety of modifications and several examples. Accordingly, while various exemplary embodiments are described in detail herein, these are not intended to limit the scope of exemplary embodiments to the particular exemplary embodiments only. Rather, it should be understood that the exemplary embodiments encompass all the modifications, equivalents or replacements that fall under the concept and technology scope as disclosed. Further, the terms described below are those that are defined in consideration of the functions of the present disclosure and may be varied according to users, operators or practices. Accordingly, definitions will have to be made based on the content provided throughout the description.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the exemplary embodiments, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor (not illustrated).

In the exemplary embodiments, when a certain portion is "coupled" with another portion, this means not only the "direct coupling", but also "electrical coupling" and may be accomplished with intervention of another device interposed there between. Further, when a certain portion "comprises" a certain element, unless otherwise specified, this means that the certain portion may additionally include another element, rather than precluding another element.

In order to reply to an incoming call received by the user in a situation (where the user is unable to answer the call), a mobile device may identify a caller based on identification information included in the incoming call and send a reply according to a selection made by the user or may direct the incoming call to another answering service. For example, the reply may be a voice message, an e-mail message, a facsimile, and Short Messaging Service (SMS) message in the form of a character string.

The mobile device may detect the incoming call received by the user and determine whether the incoming call is associated with a priority contact (i.e., the incoming call received from the caller in the priority list). If the incoming call is not from the priority contact, the incoming call may be directed to a voicemail. Further, if the incoming call is from the priority contact, an instance response message may be sent to the mobile device of the caller without answering the incoming call.

The exemplary embodiments provide a method for managing at least one operation of a mobile device while riding a motorcycle. The method includes detecting that a motorcycle mode is enabled, where the motorcycle mode is configured to automatically manage the at least one operation of the mobile device while a user of the mobile device is riding the motorcycle. Further, the method includes performing the at least one operation based on a context of the motorcycle and the user.

In an exemplary embodiment, performing the at least one operation based on the context of the motorcycle and the user includes receiving an incoming call from a caller device while the user is riding the motorcycle, determining a speed of the motorcycle as the context of the motorcycle and the user, detecting that the speed of the motorcycle exceeds a speed threshold, and performing the at least one operation to elicit a response message at the caller device indicating that the user is riding the motorcycle.

In an exemplary embodiment, the method further includes receiving, by the mode controller, an input from the caller device indicating that the incoming call is urgent. Further, the method includes eliciting, by the mode controller, an incoming call notification. Further, the method includes detecting, by the mode controller, the speed of the motorcycle. Further, the method includes causing the mode controller to one of perform the at least one operation to lock a screen of the mobile device to restrict answering the incoming call by the user when the speed of the motorcycle exceeds the speed threshold, and perform the at least one operation to unlock the screen of the mobile device when the speed of the motorcycle is within the speed threshold.

In an exemplary embodiment, the incoming call notification is elicited on at least one of the screen of the mobile device, a screen of a wearable device paired with the mobile device, a screen of a smart helmet paired with the mobile device, and a smart mirror of the motorcycle paired with the mobile device.

In an exemplary embodiment, the incoming call notification is elicited through at least one of the mobile device, a wearable device paired with the mobile device, a smart helmet paired with the mobile device, and a smart mirror of the motorcycle paired with the mobile device.

In an exemplary embodiment, the method further includes receiving, by the mode controller, an input from the caller device indicating to forward the incoming call to a contact associated with the user. Further, the method includes performing, by the mode controller, the at least one operation to automatically forward the incoming call to the contact associated with the user.

In an exemplary embodiment, performing the at least one operation based on the context of the motorcycle and the user includes receiving the incoming call from the caller device while the user is riding the motorcycle, determining a speed of the motorcycle as the context of the motorcycle and the user, detecting that the speed of the motorcycle exceeds a speed threshold, and performing the at least one operation to send a message to the caller, where the message includes at least one of a location of the user and an estimated time to reach a destination by the user.

In an exemplary embodiment, performing the at least one operation based on the context of the motorcycle and the user includes receiving the incoming call from the caller device while the user is riding the motorcycle, determining a battery level of the mobile device as the context of the motorcycle and the user, determining the battery level of the mobile device is within a battery threshold, and performing the at least one operation to automatically forward the incoming call to the contact associated with the user.

In an exemplary embodiment, performing the at least one operation based on the context of the motorcycle and the user includes receiving the incoming call from the caller device while the user is riding the motorcycle, determining that the caller of the incoming call is a prioritized caller, and performing the at least one operation to provide an incoming call notification to the caller through at least one of the wearable device paired with the mobile device, the smart helmet paired with the mobile device, and the smart mirror of the motorcycle paired with the mobile device.

In an exemplary embodiment, the at least one operation is detected by the mobile device by tapping the mobile device against a smart poster.

In an exemplary embodiment, performing the at least one operation based on the context of the motorcycle and the user includes determining the speed of the motorcycle as the context of the motorcycle, detecting that the speed exceeds the speed threshold, determining whether a smart helmet is worn by the user as the context of the user, and performing the at least one operation to automatically send the message to at least one contact associated with the user in response to determining that the smart helmet is not worn by the user of the motorcycle.

In an exemplary embodiment, the mobile device determines whether the smart helmet is worn by the user based on one of proximity of the smart helmet with respect to the mobile device and a sensor on the smart helmet.

In an exemplary embodiment, performing the at least one operation based on the context of the motorcycle and the user includes detecting a degree of resistance encountered on the smart helmet worn by the user as the context of the motorcycle and the user, and performing the at least one operation to automatically send the message to the at least one contact associated with the user.

In an exemplary embodiment, performing the at least one operation based on the context of the motorcycle and the user includes determining the speed of the motorcycle as the context of the motorcycle and the user, detecting that the speed of the motorcycle exceeds the speed threshold based on a current location of the user, and performing the at least one operation to alert the user to regulate the speed of the motorcycle based on the location.

In an exemplary embodiment, performing the at least one operation based on the context of the motorcycle and the user includes determining the current location of the user riding the motorcycle as the context of the motorcycle and the user, receiving a current location of another user riding another motorcycle, and performing the at least one operation to cause to display a navigation notification indicating the current location of the another user.

In an exemplary embodiment, the navigation notification is displayed on the screen of the mobile device.

In an exemplary embodiment, the navigation notification is displayed on the smart mirror of the motorcycle paired with the mobile device.

In an exemplary embodiment, performing the at least one operation based on the context of the motorcycle and the user includes determining a destination to be traveled by the user as the context of the motorcycle and the user, detecting the current location of the user as the context of the motorcycle and the user, and performing the at least one operation to cause to display a navigation indication to the destination with respect to the current location of the user using left and right smart mirrors of the motorcycle.

Accordingly, the exemplary embodiments provide a mobile device for managing at least one operation while riding a motorcycle. The mobile device includes a mode controller configured to detect that a motorcycle mode is enabled, where the motorcycle mode configured to automatically manage the at least one operation of the mobile device while a user of the mobile device is riding the motorcycle. Further, the motorcycle mode controller configured to perform the at least one operation based on a context of the motorcycle and the user.

Accordingly, the exemplary embodiments provide a computer program product including a computer executable program code recorded on a computer readable non-transitory storage medium. The computer executable program code when executed causing the actions including detecting, by a mode controller, that a motorcycle mode is enabled, where the motorcycle mode configured to automatically manage at least one operation of a mobile device while a user of the mobile device is riding a motorcycle. Further, the computer executable program code when executed causing the actions including performing, by the mode controller, the at least one operation based on a context of the motorcycle and the user.

Unlike related art systems and methods, one or more exemplary embodiments provide a simple and robust method for managing the at least one operation of the mobile device (i.e., such as eliciting a response message at a caller device indicating that the user is riding the motorcycle, lock a screen of the mobile device to restrict answering the incoming call by the user when the speed of the motorcycle exceeds the speed threshold, unlock the screen of the mobile device when the speed of the motorcycle is within the speed threshold, automatically forward the incoming call to a contact associated with the user, send a message to the caller, where the message including at least one of a location of the user and an estimated time to reach a destination by the user, automatically forward the incoming call to a contact associated with the user, provide an incoming call notification to the caller through at least one of a wearable device paired with the mobile device, a smart helmet paired with the mobile device, and a smart mirror of the motorcycle paired with the mobile device, automatically send a message to at least one contact associated with the user in response to determining that the smart helmet is not worn by the user of the motorcycle, automatically send a message to at least one contact associated with the user, alert the user to regulate the speed of the motorcycle based on the location, cause to display a navigation notification indicating the current location of the another user, and cause to display a navigation indication to the destination with respect to the current location of the user using left and right smart mirrors of the motorcycle).

Further, in one or more exemplary embodiments, the motorcycle mode may be used or enabled to prevent disturbances in case of any unimportant calls and provides quick access dashboard to the user to view information. The motorcycle mode provides easy means to filter the incoming calls. Further, one or more exemplary embodiments provide the motorcycle mode to the user, which is used to prevent unnecessary disturbances to the user while the user is riding the motorcycle and allows for urgent call notifications to the user. When the motorcycle mode is enabled, the motorcycle cycle mode impacts the physical as well as graphical user interface (GUI) thus, disabling access to the users. The users are prevented from using additional functions, features, and/or applications of the mobile device when the motorcycle mode is enabled. Since emergencies may be from a caller side, the motorcycle mode when enabled, allows callers to determine whether their notifications must be sent to the user or not.

Further, in one or more exemplary embodiments, the motorcycle mode (i.e., S-bike mode) filters all incoming calls and notifies the user of only the urgent incoming calls. This is a filtering feature along with the capabilities of muting features. The user is provided with a visual notification or an audio notification of the urgent calls (i.e., designed specifically for traffic conditions). The user does not receive any notifications for non-urgent incoming calls.

One or more exemplary embodiments may provide an apparatus including a sensor configured to enable a motion mode indicator; and a mobile device which is configured to be coupled to the sensor for enabling the motion mode indicator and includes a processor configured to manage an operation of the mobile device, the operation including an incoming call from a caller device, by controlling a communication interface to transmit, to the caller device, a message requesting to identify a type of the incoming call, receiving, from the caller device, a certain input in response to the message, matching the received certain input with the operation pre-stored in the mobile device, and controlling the mobile device to perform the operation which is matched with the received certain input.

The sensor may be a Near Field Communication (NFC) transceiver.

Unlike related art systems and methods, in one or more exemplary embodiments, the callers can hear the audio notification prompting the caller that the user is riding the motorcycle. Further, the caller is prompted to press "1" to connect their call further and notify the user, or drop out the call. The motorcycle mode is a safety feature, with a motion lock, which ensures that the users do not use their mobile device while riding the motorcycle.

FIG. 1 illustrates a block diagram of a mobile device for managing at least one operation while a user of the mobile device is riding a motorcycle, according to an exemplary embodiment. In an exemplary embodiment, the mobile device 100 may be, for example, a laptop, a desktop computer, a mobile phone, a smart phone, Personal Digital Assistant (PDA), a tablet, a phablet, a consumer electronic device, a dual display device, or any other electronic device. In an exemplary embodiment, the mobile device 100 includes a mode controller 102 (e.g., a processor or a microprocessor), a user interface (UI) 104, a sensor 106, a navigation unit 108, a location detector 110, a processor 112, a memory 114, and a communication unit 116 (e.g., a communication processor or a communication interface).

The mode controller 102 may be configured to detect that a motorcycle mode is enabled. The motorcycle mode is configured to automatically manage the at least one operation of the mobile device 100 while a user of the mobile device 100 is riding the motorcycle. Further, the mode controller 102 may be configured to perform the at least one operation based on a context of the motorcycle and the user. The exemplary embodiments illustrating different operation(s) performed and/or the additional functionalities are described below with reference to FIGS. 2A to 2D.

In an exemplary embodiment, the motorcycle mode is enabled by tapping the mobile device 100 against a smart poster (i.e., a Near Field Communication (NFC) tag or sticker including a transceiver or a transmitter and/or a receiver) on the motorcycle. An example is described below with reference to FIG. 3A. In another exemplary embodiment, the motorcycle mode is enabled by performing a gesture, on a motorcycle mode icon, by the user in a quick panel (i.e., notification panel) of the mobile device 100, as described below with reference to FIG. 3B.

Further, the UI 104 may be configured to update UI components and store data to shared preferences such as contacts list, user information, or the like. In an exemplary embodiment, the motorcycle mode is specific to the user to prevent the user in receiving unimportant incoming calls while the user is riding the motorcycle. The motorcycle mode is enabled or disabled by tapping the mobile device 100 to the smart poster on the motorcycle. By enabling the motorcycle mode, the user can control usage of the motorcycle mode and other functionalities associated with the motorcycle mode. Unlike related art methods, by enabling the motorcycle mode, one or more of following functions may be achieved as described below:

a. It saves the user from receiving unnecessary/unimportant calls while the user is riding the motorcycle. An automated response message from the mobile device 100 of the user is sent to the caller. The caller is prompted to input extra key (i.e., press "1") indicating that the call is important (i.e., urgent) for the user and should be answered immediately.

b. The user can store a plurality of contacts available in the mobile device 100 along with a location in a priority list. If the user receives the call from the contacts which are part of the priority list while riding the motorcycle, current location and an estimated time of reach to a destination by the user is automatically sent through a message (i.e., SMS) to the caller.

c. The motorcycle mode is not disabled unless the user stops the motorcycle.

In an example, the user taps the mobile device 100 on the NFC sticker to enable the motorcycle mode. When the user receives the call and an automated voice is played (i.e., prompted) to the caller indicating that the user is riding the motorcycle and prompted to press "1" on the keypad thus, indicating that the call is the urgent incoming call for the user. Based on the voice, the caller can either disconnect the call or press "1" to proceed with the call. The mobile device 100 elicits an incoming call notification (i.e., ringtone) displaying the urgent incoming call to the user. Further, the user unable to answer the urgent incoming call unless until the motorcycle is stopped by the user. The motorcycle mode is a safety feature preventing the users from using the mobile device 100 while riding the motorcycle.

The sensor 106 may be configured to detect a speed of the motorcycle as a context of the motorcycle and the user. Further, the sensor 106 may be configured to send the detected speed of the motorcycle to the mode controller 102 to perform the operation. The navigation unit 108 may be configured to generate a navigation notification indicating a current location of the user. Further, the navigation unit 108 may be configured to send the generated navigation notification to the mode controller 102 to perform the operation of the mobile device 100. The location detector 110 may be configured to determine a destination to be traveled by the user as the context of the motorcycle and the user. Further, the location detector 110 may be configured to detect the current location of the user as the context of the motorcycle and the user. Further, the location detector 110 may be configured to send the detected current location to the motorcycle mode controller 102 to perform the operation.

The processor 112 may be configured to communicate with various units to change content displayed on the UI 104 or share data. Further, the processor 112 may be configured to communicate with various units to manage the at least one operation of the mobile device 100 while the user is riding the motorcycle. In an exemplary embodiment, the functionalities performed by the mode controller 102 may be performed by the processor 112.

The memory 114 may include one or more computer-readable storage media. The memory 114 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 114 may, in some examples, be considered a non-transitory storage medium. The term "non-transitory" may indicate that the storage medium is not embodied in a carrier wave or a propagated signal. However, the term "non-transitory" should not be interpreted that the memory 114 is non-movable. In some examples, the memory 114 may be configured to store larger amounts of information than the memory. In certain examples, a non-transitory storage medium may store data that can, over time, change (e.g., in Random Access Memory (RAM) or cache). The communication unit 116 communicates internally with the units and externally with networks.

According to an exemplary embodiment, the electronic device 100, i.e., the mobile device, may include a sensor which is configured to sense a motion speed of the electronic device 100 and a processor 112 which is configured to, in response to receiving a call from another electronic device through the communication unit 116, provide, to a server, a status of the electronic device 100 based on the motion speed for notifying the another electronic device of the status, and determine a type of the call according to an input received from the another electronic device after providing the status. For example, the status of the electronic device 100 may be provided from an external server (not illustrated) to the another electronic device (a caller device) such as an automatic voice message. The electronic device 100 may receive the input from the another electronic device through an external server. The processor 112 may be configured to control to provide a notification related to the call in the electronic device based on the type of the call.

The processor 112 may be configured to provide a message for determining a type of the call to the another electronic device based on a status of the mobile device 100. For example, the status of the mobile device 100 may be at least one of whether the mobile device 100 is in motion based on a Global Positioning System (GPS) information and whether a speed of a vehicle in which the mobile device 100 is positioned is equal to or greater than a predetermined speed, but this is not limiting.

For example, a message for determining a type of the event may be an automatic voice message or a text message which are sent to another electronic device, and the message may include a predetermined input message indicating whether the call sent from another device is an urgent message or an urgent call, but this is not limiting.

The sensor (not illustrated) may be a GPS sensor (not illustrated) which acquires the GPS information of the electronic device 100. The processor 112 may be configured to control the sensor to sense the motion speed of the electronic device by at least one of using the GPS information and determining a speed of a vehicle in which the electronic device 100 is positioned.

The processor 112 may be configured to provide the notification related to the call if the type of the call indicates that the call is requested urgently, and disconnect the call if the type of the call indicates that the call is not requested urgently.

The mobile device 100 may further include a display (not illustrated). The processor 112 may be configured to provide the notification in a lock-up mode which limits a touch input on the display while the notification is being provided in the electronic device.

The processor 110 may be configured to release the lock-up mode of the display if the motion speed of the electronic device is less than a threshold and to perform an operation related to the call in response to sensing a user command after the lock-up mode of the display is released.

The processor 110 may be configured to provide, to the another electronic device, at least one of state information, location information and estimated arrival time to destination of the electronic device if the motion speed is equal to or greater than a threshold while the notification related to the call is controlled to not be provided in the electronic device 100.

The processor 110 may be configured to transmit the notification to a helmet which is paired with the electronic device if the motion speed is equal to or greater than a threshold. For example, the electronic device 100 may be connected with the helmet via NFC transceiver, but this is not limiting.

The processor 110 may be configured to end receipt of the call if the type of the call is not urgent or a contact information of the another electronic device is not included in a priority list and to control the memory 114 to information of the received call.

The processor 110 may be configured to determine a priority of the another electronic device based on at least one of contact information stored in the memory 114 and call history of the electronic device 100, and control the communication unit 116 to provide a notification related to the event to at least one external device paired with the mobile device 100, based on a priority of the another electronic device.

For example, external devices paired with the mobile device 100 are wearable devices such as smart watch and smart glasses, but the example is not limited thereto.

The processor 110 may be configured to, if the call is not answered and the type of the call indicates that the call is not requested urgently, register information of the call in a call history as a missed call of a vehicle riding mode. The processor 110 may be configured to, if the call is not answered and the type of the call indicates that the call is requested urgently, register the information of the call in the call history as a urgent missed call of the vehicle riding mode in the memory 114.

For example, the input by the another electronic device may be inputting a button of a particular key, but the example is not limited thereto. The input of button of a particular key received from another electronic device may be received through various methods such as voice input and touch input, but the example is not limited thereto.

In exemplary embodiments, the vehicle may, for example, be various personal transport devices including a motorcycle, a bicycle, and a car and so on, but the example is not limited thereto. The transport devices may be various types of vehicles that the user using the electronic device can ride to move.

Unlike related art systems and methods, one or more exemplary embodiments enhance the overall user experience thus, dynamically managing the at least one operation of the mobile device 100. Further, one or more exemplary embodiments may be used to prevent disturbances caused to the user by unimportant calls while the user is riding the motorcycle.

FIG. 1 shows an overview of the mobile device 100, but other exemplary embodiments are not limited thereto. Further, the mobile device 100 can include any number of units along with other hardware or software components communicating with each other. For example, the component may be, but not limited to, a process running in the controller or processor, an object, an executable process, a thread of execution, a program, or a computer. By way of illustration, both an application running on a device and the device itself may be a component.

Figure 2A:
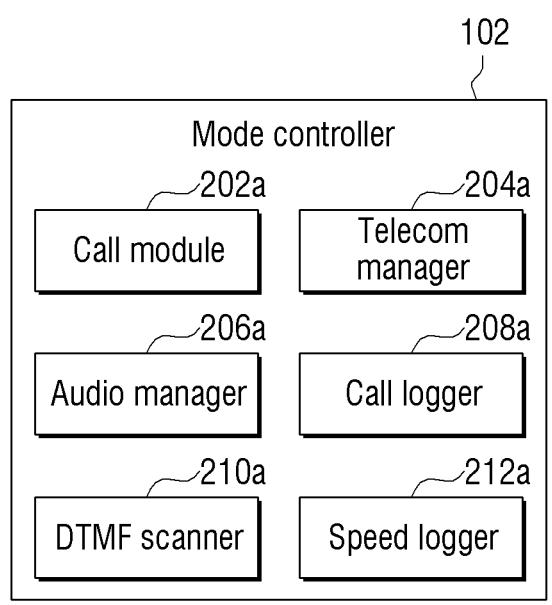
FIG. 2A is a block diagram of a motorcycle mode controller, according to an exemplary embodiment.

FIG. 2A is an example block diagram of the mode controller for performing the at least one operation to elicit a response message at a caller device indicating that the user is riding the motorcycle, according to an exemplary embodiment. In an exemplary embodiment, the mode controller 102 includes a call module 202a, a Telecom manager 204a, an audio manager 206a, a call logger 208a, a dual tone multi frequency (DTMF) scanner 210a, and a speed logger 212a.

The call module 202a may be configured to receive the incoming call from the caller and share DTMF intent. Further, the call module 202a may be configured to display the UI 104 of the incoming call and user input. The Telecom manager 204a may be configured to play a voice message when the call is auto-answered, indicating the caller to press key "1" if the call is the urgent incoming call, but the example is not limited thereto. The audio manager 206a may be configured to control the audio routing for call message.

Further, the call logger 208a may be configured to maintain two types of calls i.e., the one which the user misses due to auto-answer and second ones which are urgent incoming calls but the user is not in a situation to answer the call. The DTMF scanner 210a may be configured to receive an input from the call module 202a and determine whether the input is key "1" or not. The speed logger 212a may be configured to disable the UI 104 thus discouraging the user to answer the call while riding the motorcycle. The UI 104 is disabled until the motorcycle is stopped by the user.

FIG. 2A shows an overview of the mode controller, but other exemplary embodiments are not limited thereto. The motorcycle mode controller 102 can include any number of units along with other hardware or software components communicating with each other. For example, the component may be, but not limited to, a process running in the controller or processor, an object, an executable process, a thread of execution, a program, or a computer. By way of illustration, both an application running on a device and the device itself may be a component.

Figure 2B:
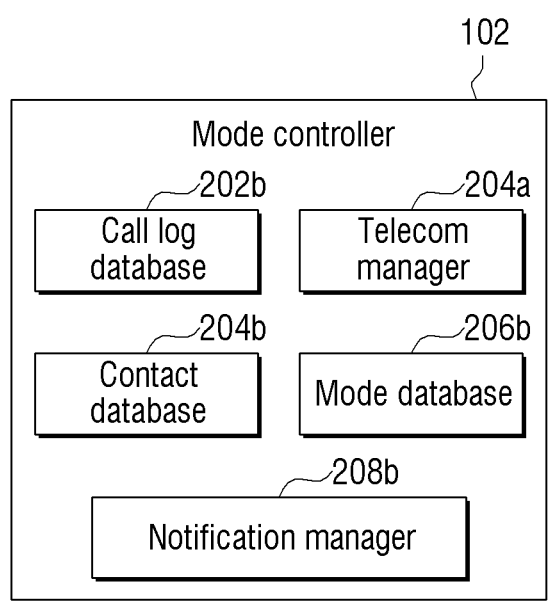
FIG. 2B is a block diagram of a motorcycle mode controller, according to an exemplary embodiment.

FIG. 2B is an example block diagram of the mode controller for performing the operation when the motorcycle mode is enabled and notifications option (or tab) on the UI is selected by the user, according to an exemplary embodiment. In an exemplary embodiment, the motorcycle mode controller 102 includes a call log database 202b, the telecom manager 204a, a contact database 204b, a motorcycle mode database 206b, and a notification manager 208b.

The call log database 202b stores all the log entries of the contacts available in the mobile device 100 of the user. The functionalities of the telecom manager 204a are described below with reference to FIG. 2A. The contact database 204b stores the contacts associated with the user. The motorcycle mode database 206b stores the information of the incoming calls received from the user riding the motorcycle and the motorcycle mode is enabled. Further, the creation of the motorcycle mode database is described below with reference to FIG. 10B. The notification manager 208b generates the notification to the user indicating number of incoming calls missed by the user while riding the motorcycle.

In another example, the mode controller 102 may be in communication with the call log database 202b, the telecom manager 204a, the contact database 204b, the motorcycle mode database 206b, and the notification manager 208b to perform the operation when the notifications option is selected by the user. Here, the mode controller 102 queries the call log database 202b for latest entry of the incoming calls received from the callers. Further, the mode controller 102 receives the missed call notification from the telecom manager 204a. After receiving the missed call notification, the mode controller 102 fetches the updated information of the caller from the contact database 204b. Further, the mode controller 102 inserts a new log in the motorcycle mode database 206b and sends a refresh request to the notification manager 208b. An example scenario displaying options on the UI 104 of the notifications is described below with reference to FIGS. 11A to 11C.

In an exemplary embodiment, the notifications are displayed and grouped for 2 sessions such as the most recent (i.e., RECENT SESSION) and the penultimate session (i.e., PREVIOUS SESSION). A session is the period between turning the motorcycle mode "ON" and "OFF" state. The recent session displays all the notifications while the motorcycle mode is in "ON" state (even if it is beyond 24 hours). Once the motorcycle mode is turned "OFF", it displays only the notifications (in both recent and previous sessions) that are within the past 24 hours.

Unlike related art systems and methods, all the calls which are missed when the motorcycle mode is enabled may be displayed in Notifications screen of the motorcycle mode. In addition to default sorting of call logs by time, there is an additional way of sorting the motorcycle mode notifications i.e., sorting by urgency. In sorting by urgency, all the urgent incoming calls that got missed are prioritized. Further, the user can make the call without navigating to any other call screen.

In an example, there are situations, where the user is riding the motorcycle and his/her family members want to contact the user. In the proposed solution, initially, the user can register some of the contacts as the priority callers for that journey. The user sets the destination using the Maps UI. Now if any call is received from those callers and the call goes unanswered, the users where about is shared with the caller via the SMS. The home and the work addresses can also be bookmarked in the motorcycle mode settings for reusability.

Further, all the calls that were missed during the motorcycle mode may be displayed in Notification tab of the motorcycle mode. These missed call logs are by default sorted as per the urgency i.e., the urgent calls that were missed are prioritized. There may be one or more criteria for deciding the urgency of the call. The user can also change the sorting order to sort by time.

Further, the user is provided with a provision to call back in response to the missed calls from the motorcycle mode notification screen itself. The missed calls notifications are maintained only for 24 hours. On the 24 hours list, the Notifications of only two motorcycle mode sessions are retained. So if the end time of the previous motorcycle mode session lies in the 24 hours window, then that session logs may be displayed along with the recent session logs.

FIG. 2B shows an overview of the motorcycle mode controller 102, but other exemplary embodiments are not limited thereto. Further, the motorcycle mode controller 102 can include any number of units along with other hardware or software components communicating with each other. For example, the component may be, but not limited to, a process running in the controller or processor, an object, an executable process, a thread of execution, a program, or a computer. By way of illustration, both an application running on a device and the device itself may be a component.

Figure 2C:
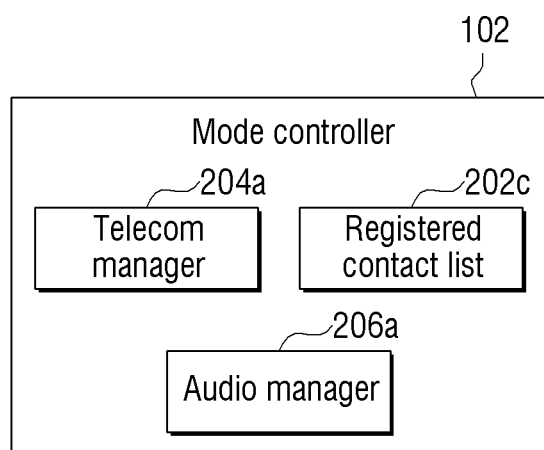
FIG. 2C is a block diagram of a motorcycle mode controller, according to an exemplary embodiment.

FIG. 2C is another example block diagram of the mode controller for performing the operation when the motorcycle mode is enabled and a Smart Reply option (or tab) on the UI is selected by the user, according to an exemplary embodiment. In an exemplary embodiment, the mode controller 102 includes the telecom manager 204a, a registered contact list 202c, and the audio manager 206a.

The registered contact list 202c includes the contacts which are listed in a priority list (i.e., priority contacts). The audio manager 206a extracts a missed call notification with the caller information from the telecom manager 204a. After receiving the missed call notification, the audio manager 206a determines whether the caller is part of the priority list. After determining that the caller is part of the priority list then, the audio manager 206a fetches a location of the user and the estimated time to reach the destination by the user. The location of the user may be determined using a GPS. Further, the audio manager 206a sends the message including the location of the user and the estimated time to reach the destination to the caller.

Unlike related art systems and methods, at the beginning of the journey, the user can register some of the contacts as the priority callers for that particular journey. The user sets the destination using the maps UI. In case of any missed call from that priority caller when the motorcycle mode is enabled, the message including the location of the user and the estimated time to reach the destination by the user is sent to the caller. The user is not disturbed for the missed and/or auto answered call.

FIG. 2C shows an overview of the motorcycle mode controller but, it is to be understood that other embodiments are not limited thereto. Further, the motorcycle mode controller 102 can include any number of units along with other hardware or software components communicating with each other. For example, the component may be, but not limited to, a process running in the controller or processor, an object, an executable process, a thread of execution, a program, or a computer. By way of illustration, both an application running on a device and the device itself may be a component.

Figure 2D:
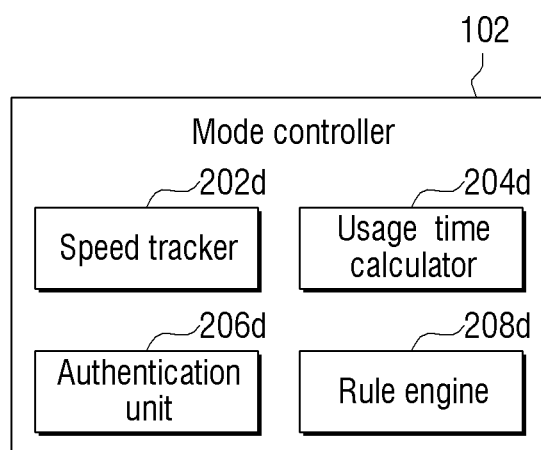
FIG. 2D is a block diagram of a motorcycle mode controller, according to an exemplary embodiment.

FIG. 2D is another example block diagram of the mode controller 102 for performing the operation when the motorcycle mode is enabled and a Rewards option (or tab) on the UI 104 is selected by the user, according to an exemplary embodiment. In an exemplary embodiment, the mode controller 102 includes a speed tracker 202d, a usage time calculator 204d, an authentication unit 206d, and a rule engine 208d.

The speed tracker 202d detects the change in speed of the motorcycle. Further, the speed information is used by the usage time calculator 204d to calculate the usage time of the user. Depending on the usage time, the UI 104 is updated. The authentication unit 206d authenticates the user of the motorcycle. The rule engine 208d extracts the usage time and calculates number of points earned by the user based on the usage time. Further, the UI 104 is updated based on the points earned by the user.

In an example, the riding history is maintained in the motorcycle mode. The user can see the riding history from the Rewards tab of the motorcycle mode. In this tab, the riding history is depicted graphically through a Time vs. Date graph. The duration of the usage of motorcycle mode is shown for each date of a month. Some points are rewarded to the user based on the riding history; number of missed calls during the motorcycle mode is enabled and other similar rules. These points may be redeemed. The user can also participate in various online contests, if any, through the collected points.

FIG. 2D shows an overview of the mode controller 102, but other exemplary embodiments are not limited thereto.

Further, the motorcycle mode controller 102 can include any number of units along with other hardware or software components communicating with each other. For example, the component may be, but not limited to, a process running in the controller or processor, an object, an executable process, a thread of execution, a program, or a computer. By way of illustration, both an application running on a device and the device itself may be a component.

Figure 3A:
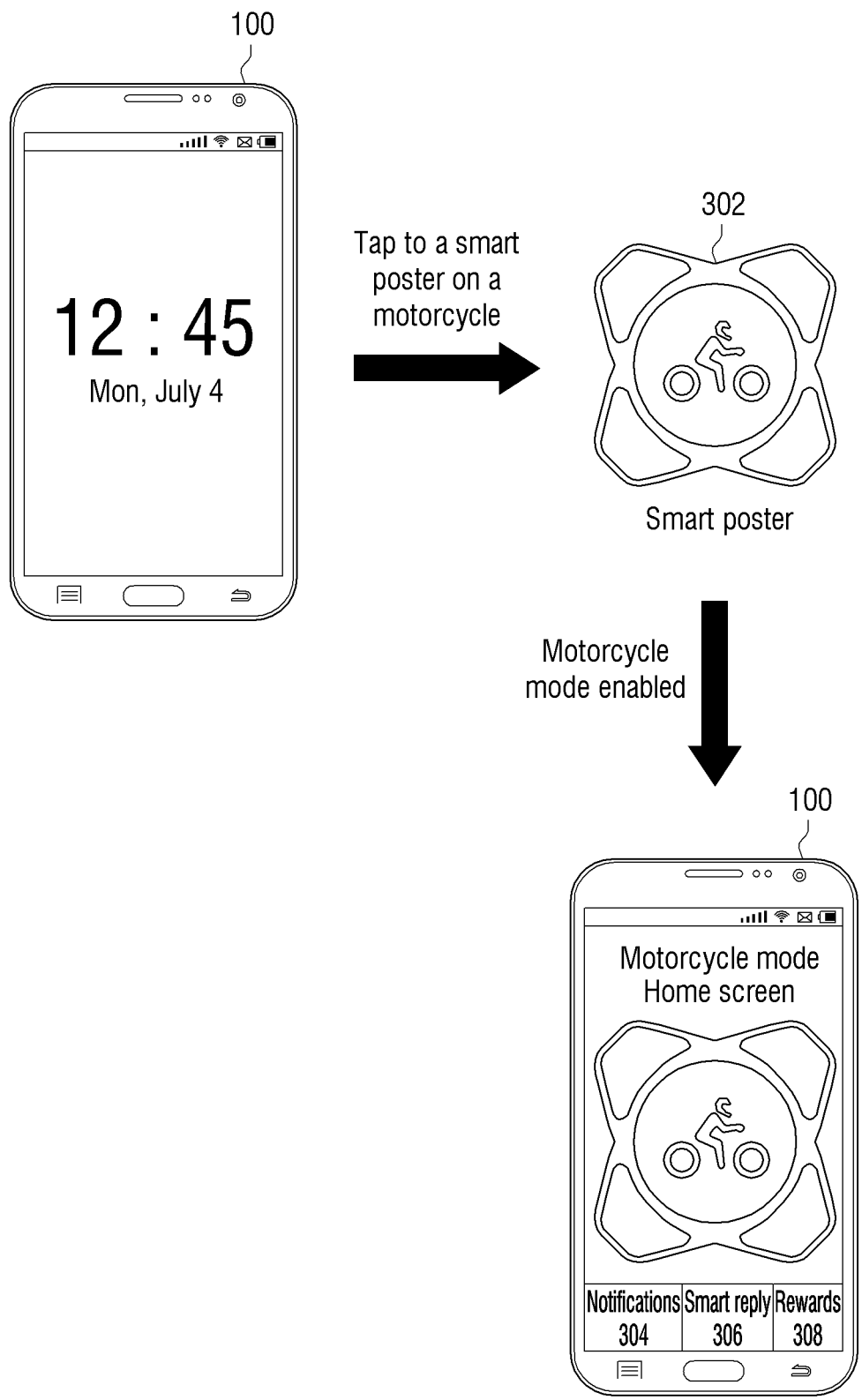
FIG. 3A shows an example in which a motorcycle mode is enabled, according to an exemplary embodiment.

FIG. 3A shows an example in which the motorcycle mode is enabled by tapping the mobile device to the smart poster on the motorcycle, according to an exemplary embodiment. As shown in FIG. 3A, the mobile device 100 is tapped to the smart poster 302 (i.e., NFC tag) on the motorcycle. After tapping, MIME type (i.e., MIME type="application/com.xxxx.motorcyclemode") information is read from the smart poster 302. The MIME type information is compared against similar value in the motorcycle mode. If the values are matched then, the motorcycle mode is enabled. After enabling the motorcycle mode, a home screen of the motorcycle mode is displayed with different options (Tabs) such as Notifications 304, Smart reply 306, and Rewards 308 as shown in FIG. 3A.

Figure 3B:
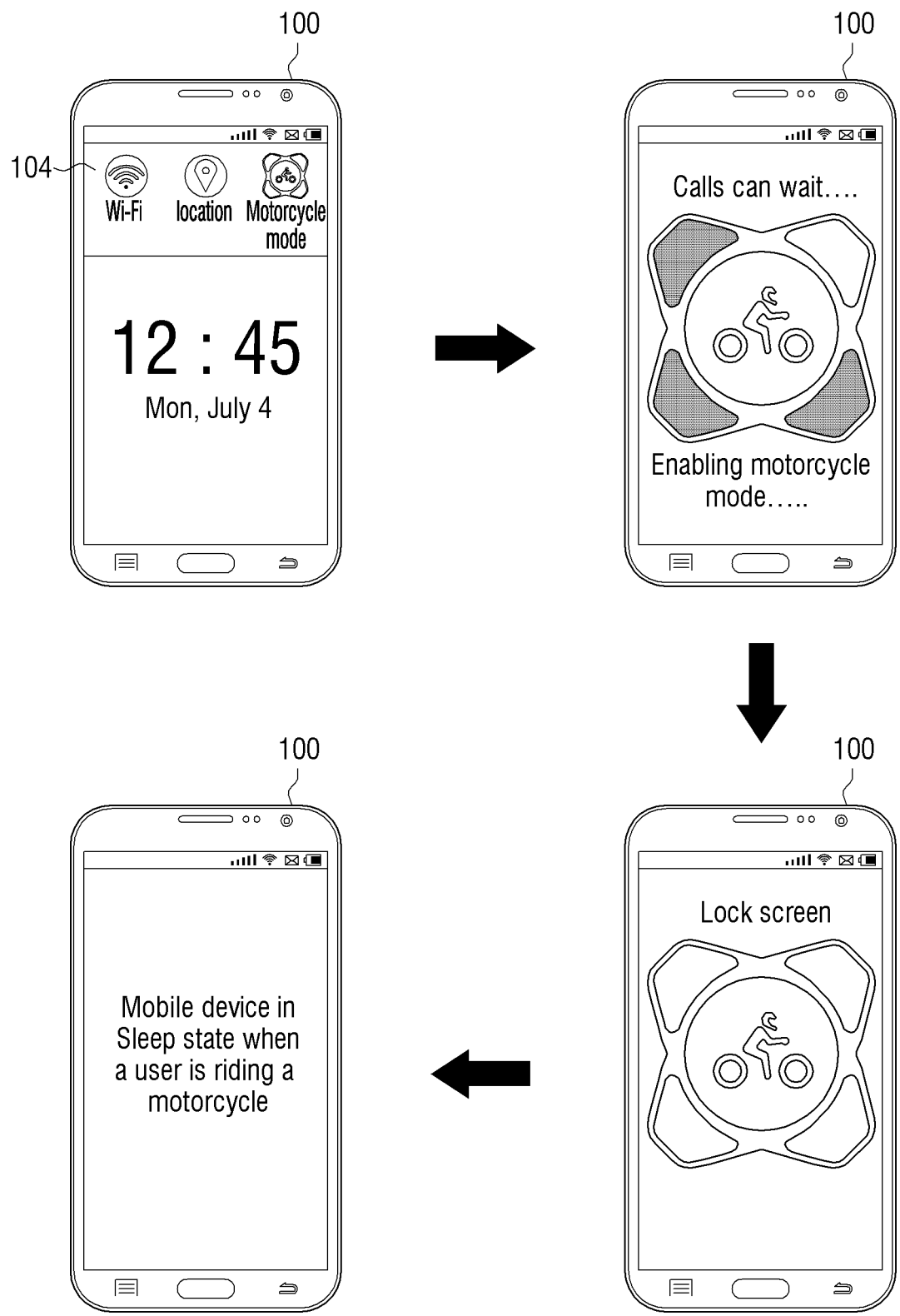
FIG. 3B shows an example in which a motorcycle mode is enabled, according to an exemplary embodiment.

FIG. 3B shows an example in which the motorcycle mode is enabled by selecting a motorcycle mode icon in the notification panel of the mobile device, according to an exemplary embodiment. As shown in FIG. 3B, the user can select the motorcycle mode icon to enable the motorcycle mode. After enabling the motorcycle mode, a screen (i.e., UI 104) of the mobile device 100 is locked for the user not to perform any operations on the mobile device 100 while riding the motorcycle. Further, the mobile device 100 enters into a sleep state while the user is riding the motorcycle as shown in FIG. 3B.

Figure 4A:
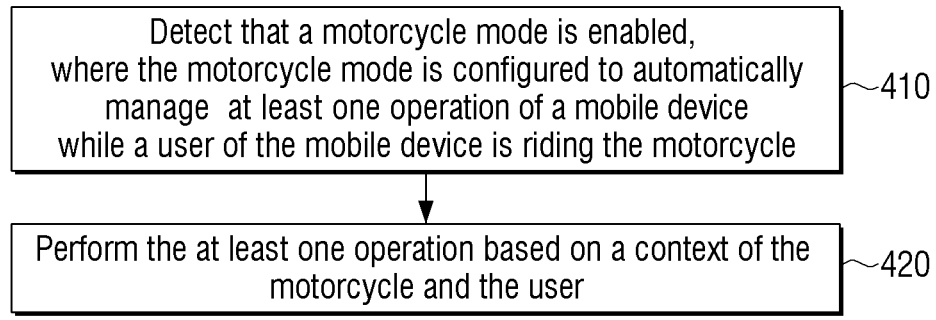
FIG. 4A is a flow chart illustrating a method for managing at least one operation of a mobile device, according to an exemplary embodiment.

FIG. 4A is a flow chart illustrating a method for managing the operation of the mobile device while riding the motorcycle, according to an exemplary embodiment. At operation 410, the method includes detecting that the motorcycle mode is enabled. The method allows the mode controller 102 to detect that the motorcycle mode is enabled. The motorcycle mode is configured to automatically manage the operation of the mobile device 100 while the user of the mobile device 100 is riding the motorcycle.

At operation 420, the method includes performing the operation based on the context of the motorcycle and the user. The method allows the mode controller 102 to perform the operation based on the context of the motorcycle and the user. In an exemplary embodiment, the operation is detected by the mobile device 100 by tapping the mobile device 100 against the smart poster 302. As an example, the operation performed to automatically forward the incoming call to the contact associated with the user is described below with reference to FIG. 4B. As another example, the operation performed to lock or unlock the screen of the mobile device 100 is described below with reference to FIG. 4C. As another example, the operation performed to send the message to the caller is described below with reference to FIG. 4D. As another example, the operation performed to automatically forward the incoming call to the contact associated with the user is described below with reference to FIG. 4E. As another example, the operation performed to provide the incoming call notification to the caller is described below with reference to FIG. 4F.

As another example, the operation performed to automatically send the message to the contact associated with the user in response to determining that the smart helmet is not worn by the user of the motorcycle is described below with reference to FIG. 4G. As another example, the operation performed to automatically send the message to the at least one contact associated with the user is described below with reference to FIG. 4H. As another example, the operation performed to alert the user to regulate the speed of the motorcycle based on the location is described in conjunction with FIG. 4I. As another example, the operation performed to cause to display a navigation notification indicating the current location of another user is described below with reference to FIG. 4J. As another example, the operation performed to cause to display a navigation indication to the destination with respect to the current location of the user using left and right smart mirrors of the motorcycle is described below with reference to FIG. 4K.

Figure 4B:
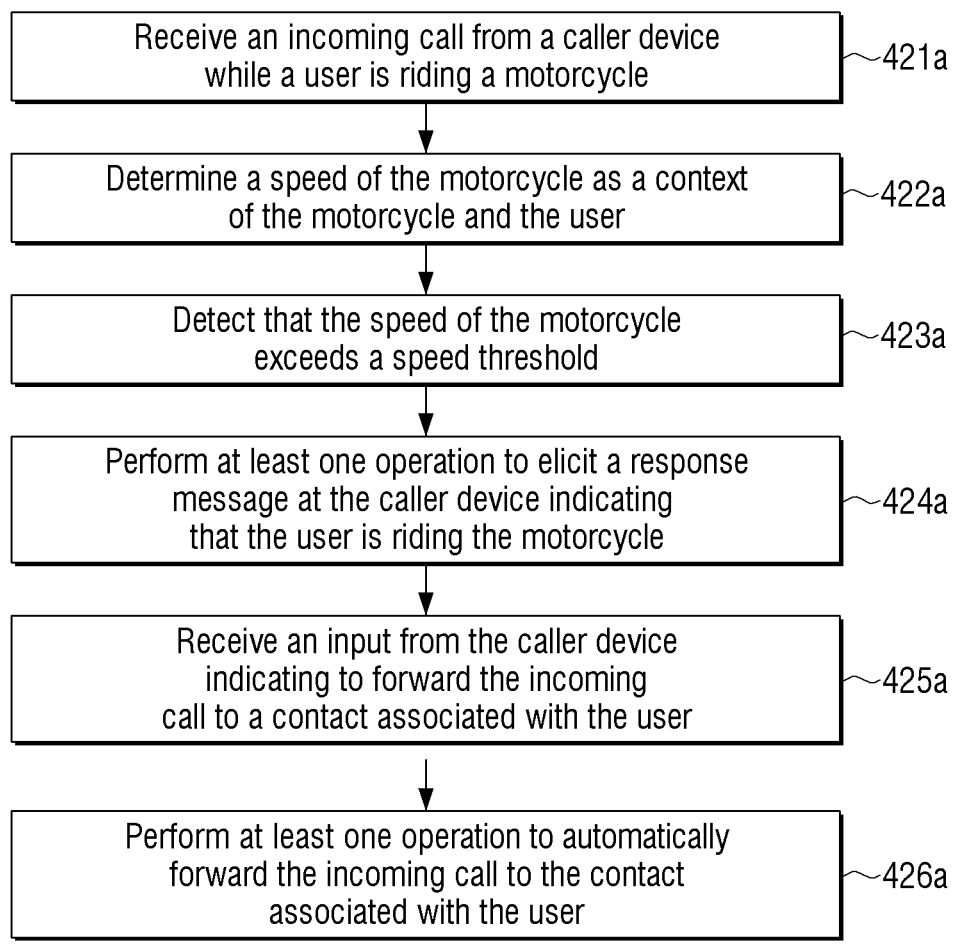
FIG. 4B is a flow chart illustrating a method for performing at least one operation to automatically forward an incoming call to a contact, according to an exemplary embodiment.

FIG. 4B is a flow chart illustrating a method for performing the operation to automatically forward the incoming call to the contact associated with the user based on the context of the motorcycle and the user, according to an exemplary embodiment. At operation 421a, the method includes receiving the incoming call from a caller device while the user is riding the motorcycle. The method allows the motorcycle mode controller 102 to receive the incoming call from the caller device while the user is riding the motorcycle.

At operation 422a, the method includes determining the speed of the motorcycle as the context of the motorcycle and the user. The method allows the mode controller 102 to determine the speed of the motorcycle as the context of the motorcycle and the user. At operation 423a, the method includes detecting that the speed of the motorcycle exceeds a speed threshold. The method allows the mode controller 102 to detect that the speed of the motorcycle exceeds the speed threshold. At operation 424a, the method includes performing the operation to elicit the response message at the caller device indicating that the user is riding the motorcycle. The method allows the mode controller 102 to perform the operation to elicit the response message at the caller device indicating that the user is riding the motorcycle.

At operation 425a, the method includes receiving an input from the caller device indicating to forward the incoming call to the contact associated with the user. The method allows the motorcycle mode controller 102 to receive the input from the caller device indicating to forward the incoming call to the contact associated with the user. At operation 426a, the method includes performing the operation to automatically forward the incoming call to the contact associated with the user. The method allows the motorcycle mode controller 102 to perform the operation to automatically forward the incoming call to the contact associated with the user.

Figure 4C:
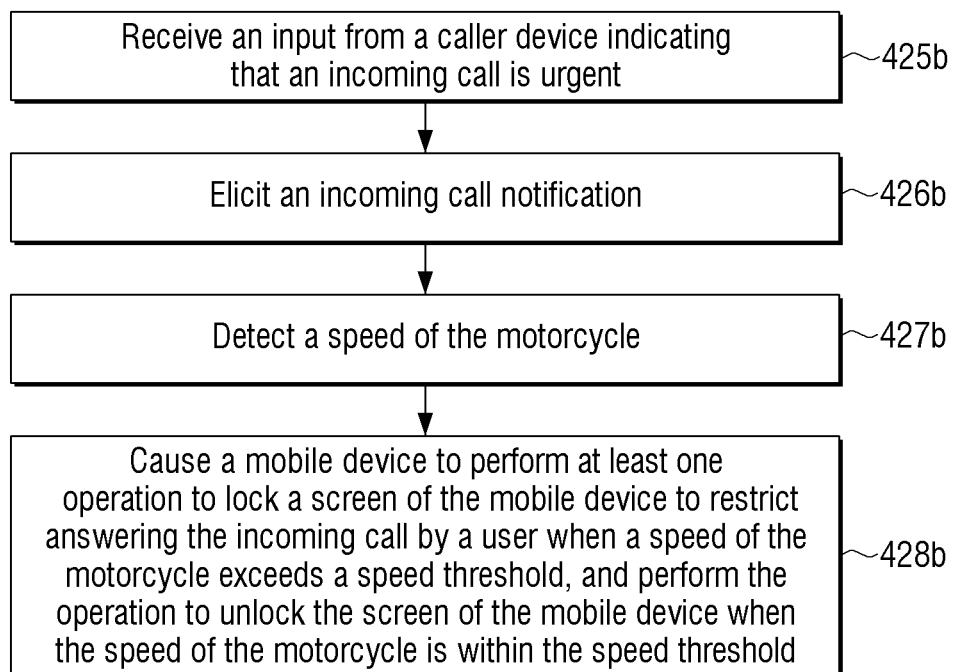
FIG. 4C is another flow chart illustrating a method for performing at least one operation to lock or unlock a screen of a mobile device, according to an exemplary embodiment.

FIG. 4C is another flow chart illustrating a method for performing the operation to lock or unlock the screen of the mobile device based on the context of the motorcycle and the user, according to an exemplary embodiment. Steps 421b to 424b are described above in conjunction with Steps 421a to 424a of FIG. 4B.

At operation 425b, the method includes receiving the input from the caller device indicating that the incoming call is urgent. The method allows the mode controller 102 to receive the input from the caller device indicating that the incoming call is urgent. At operation 426b, the method includes eliciting the incoming call notification. The method allows the mode controller 102 to elicit the incoming call notification.

In an exemplary embodiment, the incoming call notification is provided on at least one of the screen of the mobile device 100, a screen of a wearable device paired with the mobile device 100, a screen of the smart helmet paired with the mobile device 100, and a smart mirror of the motorcycle paired with the mobile device 100. In an exemplary embodiment, the incoming call notification is elicited through at least one of the mobile device 100, the wearable device paired with the mobile device 100, the smart helmet paired with the mobile device 100, and the smart mirror of the motorcycle paired with the mobile device 100.

At operation 427b, the method includes detecting the speed of the motorcycle. The method allows the mode controller 102 to detect the speed of the motorcycle. At operation 428b, the method includes causing the mobile device 100 to one of perform the operation to lock the screen of the mobile device 100 to restrict answering the incoming call by the user when the speed of the motorcycle exceeds the speed threshold, and perform the operation to unlock the screen of the mobile device 100 when the speed of the motorcycle is within the speed threshold. The method allows the mode controller 102 to cause the mobile device 100 to one of perform the operation to lock the screen of the mobile device 100 to restrict answering the incoming call by the user when the speed of the motorcycle exceeds the speed threshold, and perform the operation to unlock the screen of the mobile device 100 when the speed of the motorcycle is within the speed threshold.

Figure 4D:
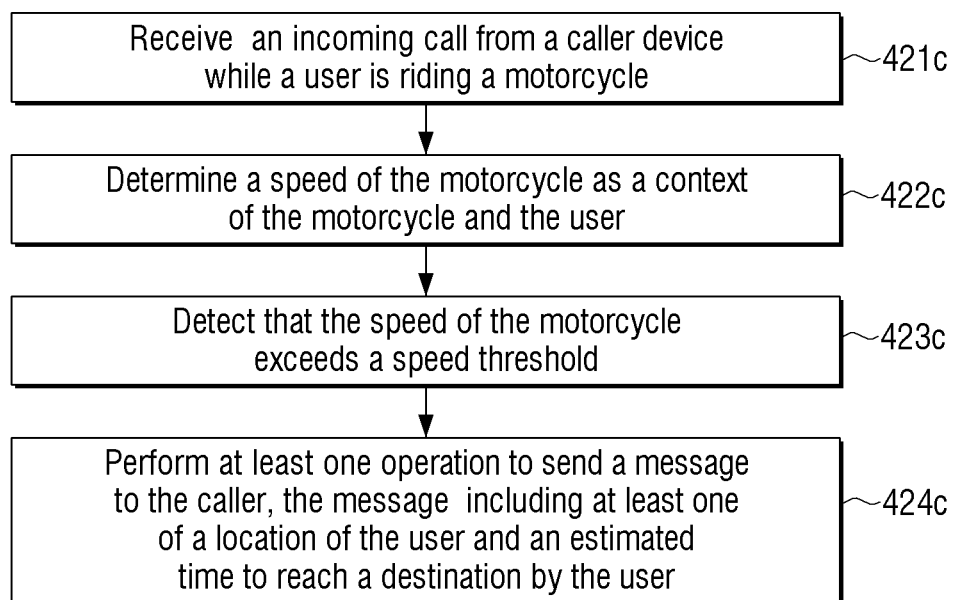
FIG. 4D is another flow chart illustrating a method for performing at least one operation to send a message to a caller, according to an exemplary embodiment.

FIG. 4D is another flow chart illustrating a method for performing the operation to send the message to the caller, according to an exemplary embodiment. At operation 421c, the method includes receiving the incoming call from the caller device while the user is riding the motorcycle. The method allows the mode controller 102 to receive the incoming call from the caller device while the user is riding the motorcycle.

At operation 422c, the method includes determining the speed of the motorcycle as the context of the motorcycle and the user. The method allows the mode controller 102 to determine the speed of the motorcycle as the context of the motorcycle and the user. At operation 423c, the method includes detecting that the speed of the motorcycle exceeds the speed threshold. The method allows the mode controller 102 to detect that the speed of the motorcycle exceeds the speed threshold.

At operation 424c, the method includes performing the operation to send the message to the caller. The method allows the mode controller 102 to perform the operation to send the message to the caller. The message includes at least one of the locations of the user and the estimated time to reach the destination by the user.

Figure 4E:
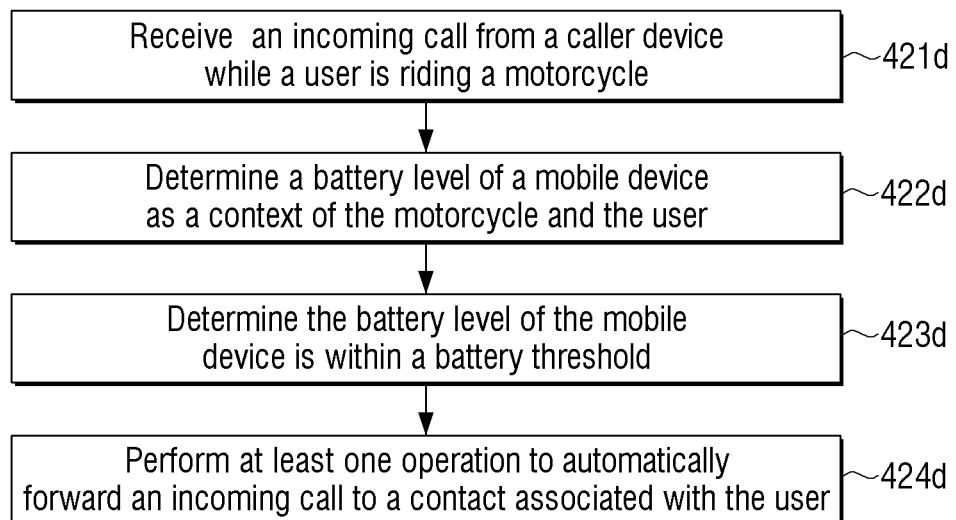
FIG. 4E is another flow chart illustrating a method for performing at least one operation to automatically forward an incoming call to a contact, according to an exemplary embodiment.

FIG. 4E is another flow chart illustrating a method for performing the operation to automatically forward the incoming call to the contact associated with the user, according to an exemplary embodiment. At operation 421d, the method includes receiving the incoming call from the caller device while the user is riding the motorcycle. The method allows the mode controller 102 to receive the incoming call from the caller device while the user is riding the motorcycle.

At operation 422d, the method includes determining a battery level of the mobile device 100 as the context of the motorcycle and the user. The method allows the mode controller 102 to determine the battery level of the mobile device 100 as the context of the motorcycle and the user. At operation 423d, the method includes determining the battery level of the mobile device 100 is within a battery threshold. The method allows the mode controller 102 to determine the battery level of the mobile device 100 is within the battery threshold.

At operation 424*d*, the method includes performing the operation to automatically forward the incoming call to the contact associated with the user. The method allows the mode controller 102 to perform the at least one operation to automatically forward the incoming call to the contact associated with the user.

Figure 4F:
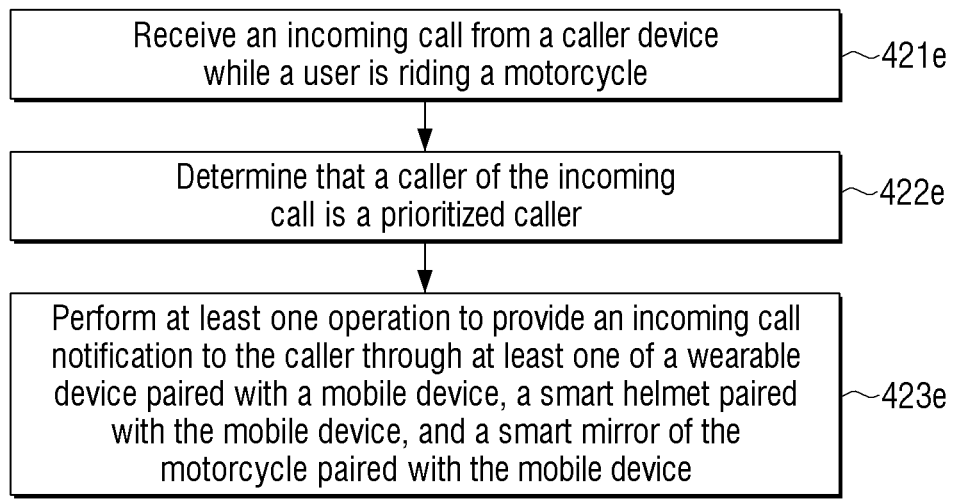
FIG. 4F is another flow chart illustrating a method for performing at least one operation to provide an incoming call notification to a caller, according to an exemplary embodiment.

FIG. 4F is another flow chart illustrating a method for performing the operation to provide the incoming call notification to the caller, according to an exemplary embodiment. At operation 421*e*, the method includes receiving the incoming call from the caller device while the user is riding the motorcycle. The method allows the mode controller 102 to receive the incoming call from the caller device while the user is riding the motorcycle. At operation 422*e*, the method includes determining that the caller of the incoming call is a prioritized caller. The method allows the mode controller 102 to determine that the caller of the incoming call is the prioritized caller.

At operation 423*e*, the method includes performing the operation to provide the incoming call notification to the caller through at least one of the wearable device paired with the mobile device 100, the smart helmet paired with the mobile device 100, and the smart mirror of the motorcycle paired with the mobile device 100. The method allows the mode controller 102 to perform the operation to provide the incoming call notification to the caller through at least one of the wearable device paired with the mobile device 100, the smart helmet paired with the mobile device 100, and the smart mirror of the motorcycle paired with the mobile device 100.

Figure 4G:
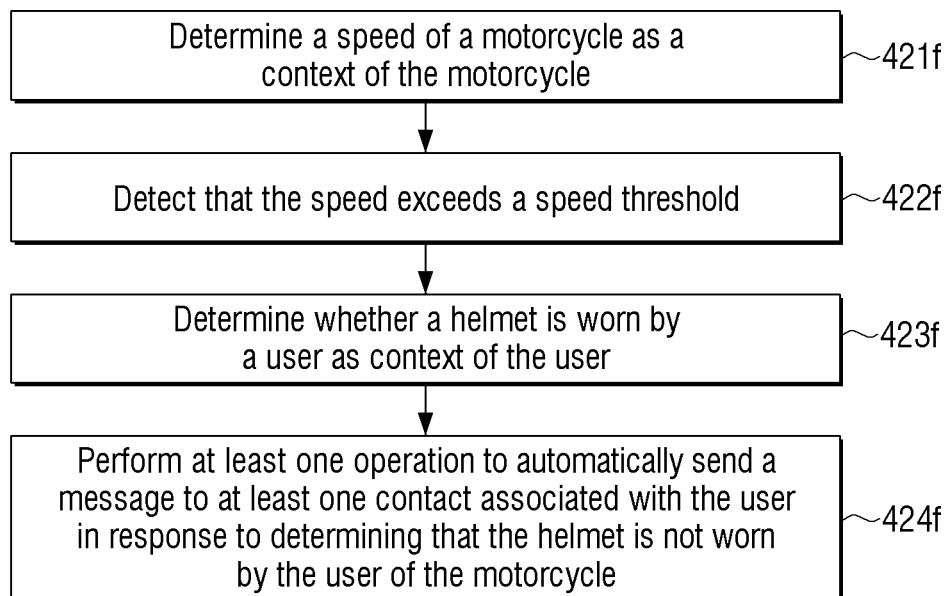
FIG. 4G is another flow chart illustrating a method for performing at least one operation to automatically send a message to a contact, according to an exemplary embodiment.

FIG. 4G is another flow chart illustrating a method for performing the operation to automatically send the message to the contact associated with the user after determining that the smart helmet is not worn by the user of the motorcycle, according to an exemplary embodiment. At operation 421*f*, the method includes determining the speed of the motorcycle as the context of the motorcycle. The method allows the mode controller 102 to determine the speed of the motorcycle as the context of the motorcycle.

At operation 422*f*, the method includes detecting that the speed exceeds the speed threshold. The method allows the mode controller 102 to detect that the speed exceeds the speed threshold. At operation 423*f*, the method includes determining whether the smart helmet is worn by the user as the context of the user. The method allows the mode controller 102 to determine whether the smart helmet is worn by the user as the context of the user.

At operation 424*f*, the method includes performing the operation to automatically send the message to the contact associated with the user in response to determining that the smart helmet is not worn by the user of the motorcycle. The method allows the mode controller 102 to perform the operation to automatically send the message to the contact associated with the user in response to determining that the smart helmet is not worn by the user of the motorcycle.

Figure 4H:
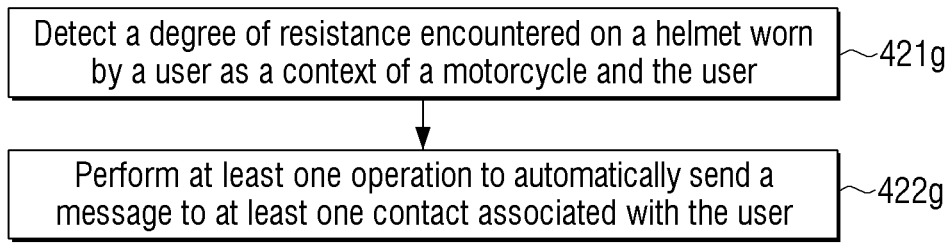
FIG. 4H is another flow chart illustrating a method for performing at least one operation to automatically send a message to a contact associated with a user, according to an exemplary embodiment.

FIG. 4H is another flow chart illustrating a method for performing the operation to automatically send the message to the contact associated with the user, according to an exemplary embodiment. At operation 421*g*, the method includes detecting a degree of resistance encountered on the smart helmet worn by the user as the context of the motorcycle and the user. The method allows the motorcycle mode controller 102 to detect the degree of resistance encountered on the smart helmet worn by the user as the context of the motorcycle and the user. At operation 422*g*, the method includes performing the operation to automatically send the message to the contact associated with the user. The method allows the mode controller 102 to perform the operation to automatically send the message to the at least one contact associated with the user.

Figure 4I:
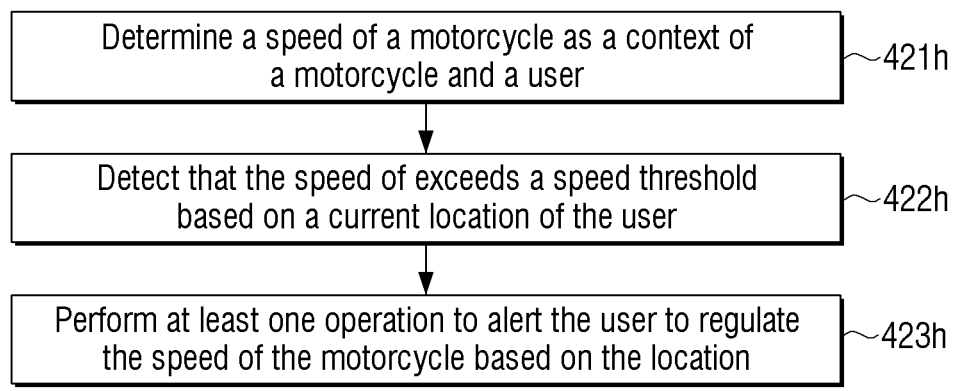
FIG. 4I is another flow chart illustrating a method for performing at least one operation to alert a user to regulate a speed of a motorcycle, according to an exemplary embodiment.

FIG. 4I is another flow chart illustrating a method for performing the operation to alert the user to regulate the speed of the motorcycle based on the location, according to an exemplary embodiment. At operation 421*h*, the method includes determining the speed of the motorcycle as the context of the motorcycle and the user. The method allows the mode controller 102 to determine the speed of the motorcycle as the context of the motorcycle and the user.

At operation 422*h*, the method includes detecting that the speed of the motorcycle exceeds the speed threshold based on the current location of the user. The method allows the mode controller 102 to detect that the speed of the motorcycle exceeds the speed threshold based on the current location of the user. At operation 423*h*, the method includes performing the operation to alert the user to regulate the speed of the motorcycle based on the location. The method allows the mode controller 102 to perform the operation to alert the user to regulate the speed of the motorcycle based on the location.

Figure 4J:
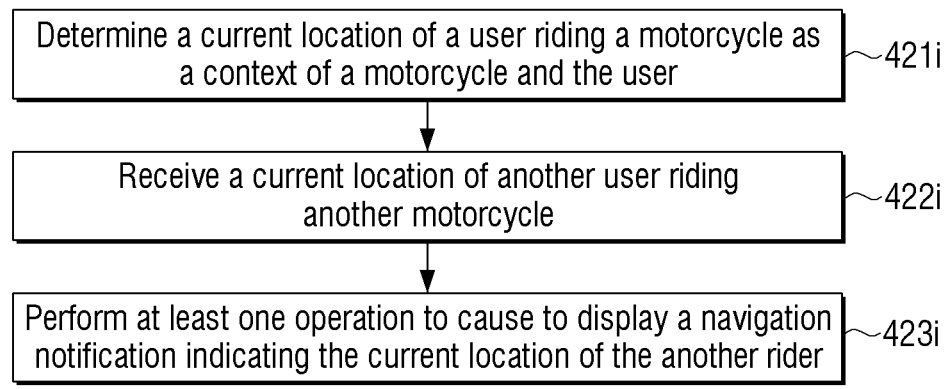
FIG. 4J is another flow chart illustrating a method for performing at least one operation to cause to display a navigation notification indicating a current location of another user, according to an exemplary embodiment.

FIG. 4J is another flow chart illustrating a method for performing the operation to cause to display a navigation notification indicating the current location of another user, according to an exemplary embodiment. At operation 421*i*, the method includes determining the current location of the user riding the motorcycle as the context of the motorcycle and the user. The method allows the motorcycle mode controller 102 to determine the current location of the user riding the motorcycle as the context of the motorcycle and the user.

At operation 422*i*, the method includes receiving the current location of another user riding another motorcycle. The method allows the mode controller 102 to receive the current location of another user riding another motorcycle. At operation 423*i*, the method includes performing the operation to cause to display the navigation notification indicating the current location of another user. The method allows the motorcycle mode controller 102 to perform the operation to cause to display the navigation notification indicating the current location of another user.

Figure 4K:
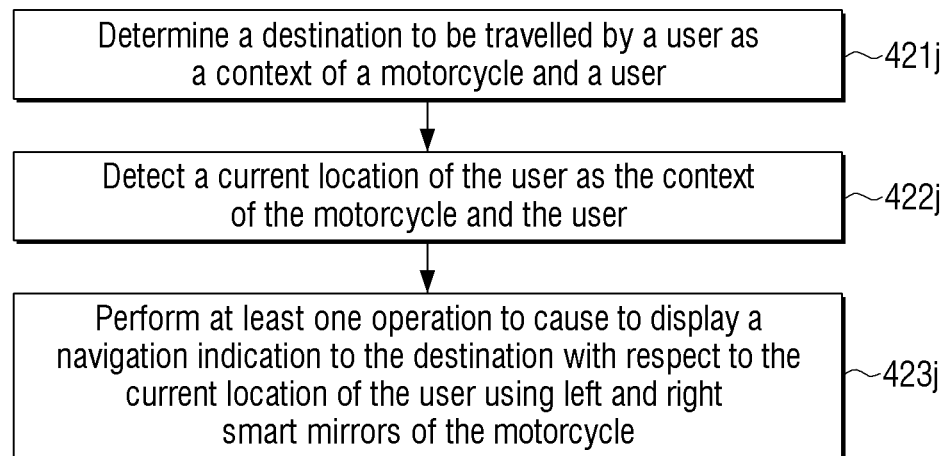
FIG. 4K is another flow chart illustrating a method for performing at least one operation to cause to display a navigation indication to a destination, according to an exemplary embodiment.

FIG. 4K is another flow chart illustrating a method for performing the operation to cause to display a navigation indication to the destination with respect to the current location of the user using left and right smart mirrors of the motorcycle, according to an exemplary embodiment.

At operation 421*j*, the method includes determining a destination to be traveled by the user as the context of the motorcycle and the user. The method allows the mode controller 102 to determine the destination to be traveled by the user as the context of the motorcycle and the user. At operation 422*j*, the method includes detecting the current location of the user as the context of the motorcycle and the user. The method allows the mode controller 102 to detect the current location of the user as the context of the motorcycle and the user.

At operation 423*j*, the method includes performing the operation to cause to display the navigation indication to the destination with respect to the current location of the user using left and right smart mirrors of the motorcycle. The method allows the mode controller 102 to perform the operation to cause to display the navigation indication to the destination with respect to the current location of the user using left and right smart mirrors of the motorcycle.

The various actions, acts, blocks, steps, or the like in the flow charts of FIGS. 4A to 4K may be performed in the order presented, in a different order or simultaneously. Further, in some embodiments, some of the actions, acts, blocks, steps, or the like may be omitted, added, modified, skipped, or the like without departing from exemplary embodiments.

Figure 5:
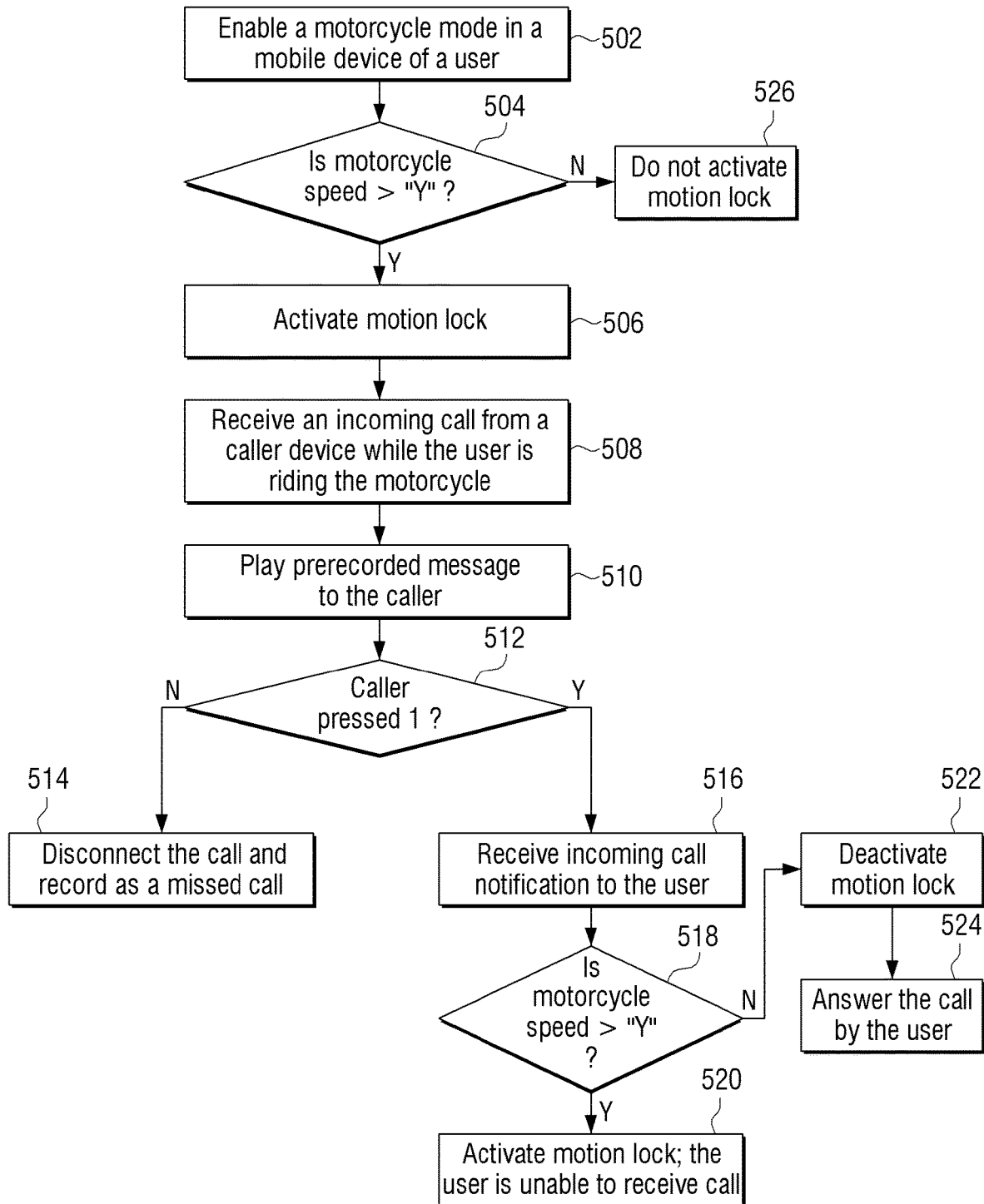
FIG. 5 is an example flow chart illustrating a method for activating or deactivating a motion lock in a mobile device, according to an exemplary embodiment.

FIG. 5 is an example flow chart illustrating a method for activating or deactivating a motion lock in the mobile device based on the speed of the motorcycle, according to an exemplary embodiment. At operation 502, the method includes enabling the motorcycle mode in the mobile device 100 of the user. The method allows the mode controller 102 to enable the motorcycle mode in the mobile device 100 of the user.

At operation 504, if it is determined that speed of the motorcycle is equal to or greater than "Y" kph or mph (for example: 10 kph or 6.2 mph) then, at operation 506, the method includes activating the motion lock. The method allows the mode controller 102 to activate the motion lock. At operation 508, the method includes receiving the incoming call from the caller device while the user is riding the motorcycle. The method allows the mode controller 102 to receive the incoming call from the caller device while the user is riding the motorcycle.

At operation 510, the method includes playing a pre-recorded message to the caller. The method allows the mode controller 102 to play the pre-recorded message to the caller. At operation 512, if it is determined that the caller did not pressed "1" then, at operation 514, the method includes disconnecting the call and recording as a missed call. The method allows the mode controller 102 to disconnect the call and record as the missed call. At operation 512, if it is determined that the caller pressed "1", at operation 516, the method includes receiving the incoming call notification to the user. The method allows mode controller 102 to receive the incoming call notification to the user.

At operation 518, if it is determined that the speed of the motorcycle is equal to or greater than "Y" kph then, at operation 520, the method includes activating the motion lock and the user is unable to receive the call. The method allows the mode controller 102 to activate the motion lock and the user is unable to receive the call. At operation 518, if it is determined that the speed of the motorcycle is within the "Y", at operation 522, the method includes deactivating the motion lock. The method allows the mode controller 102 to deactivate the motion lock. At operation 524, the method includes answering the call by the user. The method allows the mode controller 102 to answer the call by the user. At operation 504, if it is determined that the speed of the motorcycle is within the "Y" kph (for example: 10 kph) then, at operation 526, the method includes not activating the motion lock. The method allows the mode controller 102 to not activate the motion lock. An example is described below with reference to FIG. 6.

The various actions, acts, blocks, steps, or the like in the flow chart of FIG. 5 may be performed in the order presented, in a different order or simultaneously. Further, in some embodiments, some of the actions, acts, blocks, steps, or the like may be omitted, added, modified, skipped, or the like without departing from exemplary embodiments.

Figure 6:
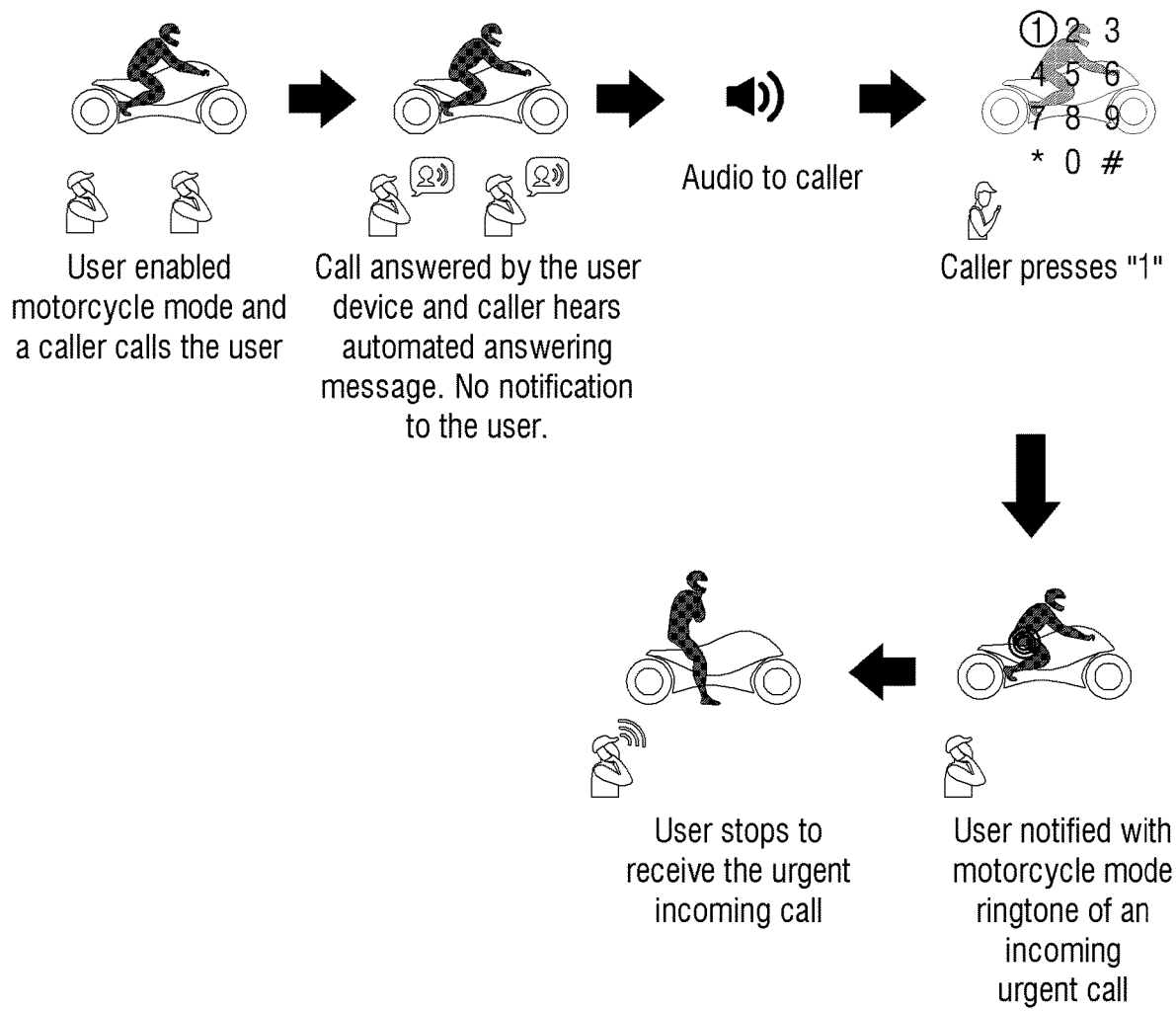
FIG. 6 shows an example in which a user is notified with a motorcycle mode ringtone of an incoming urgent call, according to an exemplary embodiment.

FIG. 6 shows an example in which the user is notified with a motorcycle mode ringtone (i.e., incoming call notification) of the incoming urgent call, according to an exemplary embodiment. As an example, the user enabled the motorcycle mode in the mobile device 100 while riding the motorcycle and the user receives the incoming call from the caller. After receiving the call, the call is answered automatically by the mobile device 100 and the caller is prompted with the pre-recorded audio message (i.e., eliciting the response message at the caller device indicating that the user is riding the motorcycle). In an example, the audio message (i.e., response message) prompted to the caller is "the user you are trying to reach is riding the motorcycle and cannot answer the call. If you want the user to stop the motorcycle and answer the urgent incoming call then press "1". Further, if the caller presses "1" then, the user is notified with the motorcycle mode ringtone indicating that the call is the urgent incoming call. After listening to the motorcycle mode ringtone, the user stops the motorcycle to answer the urgent incoming call. In an exemplary embodiment, the motorcycle mode ringtone is elicited through at least one of the mobile device 100, the wearable device paired with the mobile device 100, the smart helmet paired with the mobile device 100, and the smart mirror of the motorcycle paired with the mobile device 100.

Figure 7:
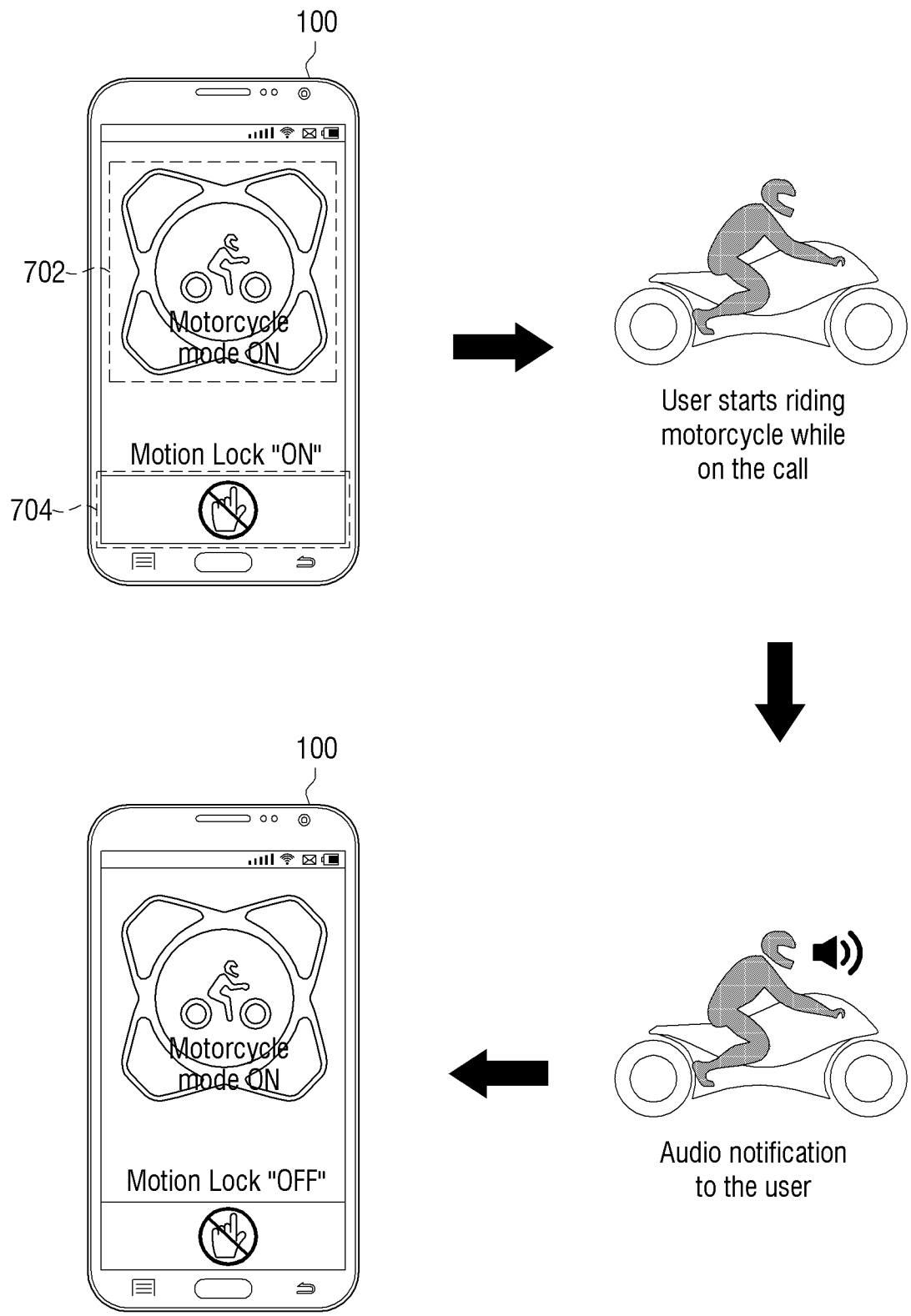
FIG. 7 shows an example in which a motion lock is enabled during an active call, according to an exemplary embodiment.

FIG. 7 shows an example in which the motion lock is enabled during an active call, according to an exemplary embodiment. As shown in FIG. 7, a motorcycle mode logo 702 and "ON" status indicates a motorcycle mode status. The functionalities of the motorcycle mode logo 702 are described below with reference to FIG. 8A. The motion lock 704 ensures that the mobile device 100 is not used by the user while riding the motorcycle. Further, the functionalities of the motion lock 704 are described below with reference to FIG. 8B. As an example, motion lock 704 is enabled and the call is received from the caller or made to the caller when the user is stationary; and the user answers the call.

As shown in FIG. 7, while on the call, the user starts to ride the motorcycle. The motorcycle mode controller 102 detects the motion of the motorcycle while the user is on call. After detecting the motion of the motorcycle while the user is on call, the mode controller 102 elicits the audio notification (i.e., incoming call notification) such as "Talking while riding the motorcycle is unsafe", and the motion lock 704 is disabled (i.e., "OFF") to the caller. Further, the user can communicate via Calls only when the user is at stationary. If the motion of the user is detected while the call is active then, the user is warned and the motion lock 704 is disabled as shown in FIG. 7.

Figure 8A:
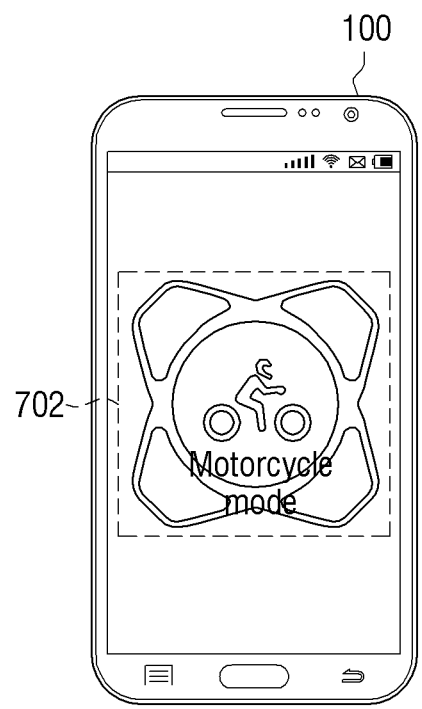
FIG. 8A shows an example of a lock screen when a motorcycle mode is enabled and a speed of a motorcycle is equal to or greater than a threshold, according to an exemplary embodiment.

FIG. 8A shows an example in which a lock screen is depicted when the motorcycle mode is enabled and the speed of the motorcycle is equal to or greater than a threshold, according to an exemplary embodiment. As shown in FIG. 8A, the lock screen is visible only when the below mentioned conditions are met such as:

a. When the speed of the motorcycle is equal to or greater than 10 kph b. The motion lock 704 is enabled c. When the user presses a hardware power button or a home key of the mobile device 100.

As shown in FIG. 8A, the motorcycle mode logo 702 and "ON" status indicates the motorcycle mode status. This is not an actionable item (i.e., the user may not able to perform any actions on the motorcycle mode logo 702). Further, the motorcycle mode logo 702 only denotes an active status of the motorcycle mode.

Figure 8B:
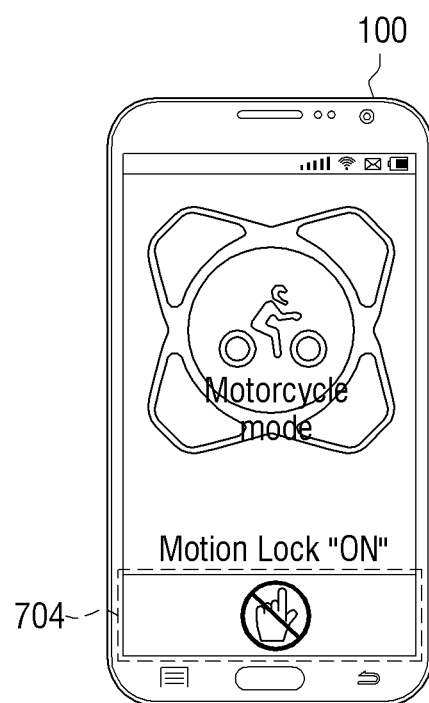
FIG. 8B shows an example of a lock screen when a motion lock is enabled and a speed of a motorcycle is equal to or greater than a threshold, according to an exemplary embodiment.

FIG. 8B is another example in which the lock screen is depicted when the motion lock is enabled and the speed of the motorcycle is equal to or greater than a threshold, according to an exemplary embodiment. As shown in FIG. 8B, the lock screen is visible only when the below mentioned conditions are met such as:

a. When the speed is equal to or greater than 10 kph.

b. When the user taps on the screen of the mobile device 100.

As shown in FIG. 8B, a motion lock 704 "ON" notification (i.e., bottom sheet notifier) is displayed on the screen of the mobile device 100 if the user taps on the screen while riding the motorcycle. The motion lock 704 "ON" notification indicates the user that access to the mobile device 100 is locked. It is accompanied with vibration alert and animation. Further, the motion lock 704 "ON" notification is not the actionable item and only notifies the locked status of the mobile device 100 to the user.

Figure 8C:
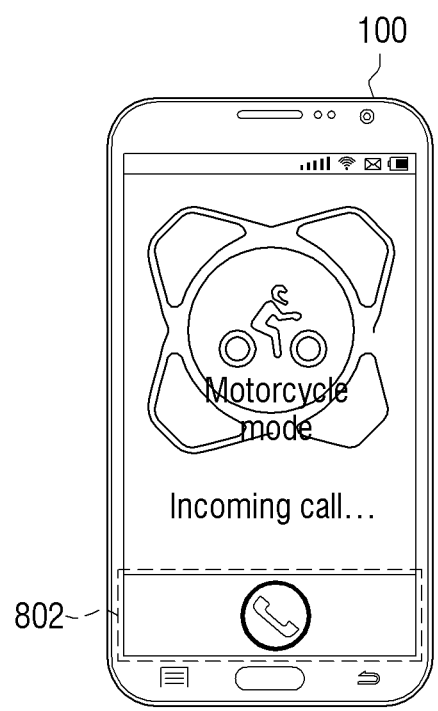
FIG. 8C shows an example of a lock screen when a user receives an incoming call, according to an exemplary embodiment.

FIG. 8C shows an example in which the lock screen is depicted when the user receives the incoming call, according to an exemplary embodiment. As shown in FIG. 8C, the lock screen is visible only when the below mentioned conditions are met such as:

a. When the speed of the motorcycle is equal to or greater than 10 kph b. If there is the urgent incoming call.

As shown in FIG. 8C, the urgent incoming call notification 802 notifies the user about the urgent incoming call on the lock screen of the mobile device 100. The urgent incoming call notification 802 is displayed on the screen of the mobile device 100 in case of the caller listens to the automated message and presses "1" to continue with the urgent incoming call. Further, the incoming urgent call notification 802 indicates a filtered urgent incoming call and accompanied with a motorcycle mode signature ringtone (i.e., incoming call notification) and the vibration alert. The user can act upon the urgent incoming call once he/she stops the motorcycle and an incoming call screen is enabled.

Figure 9:
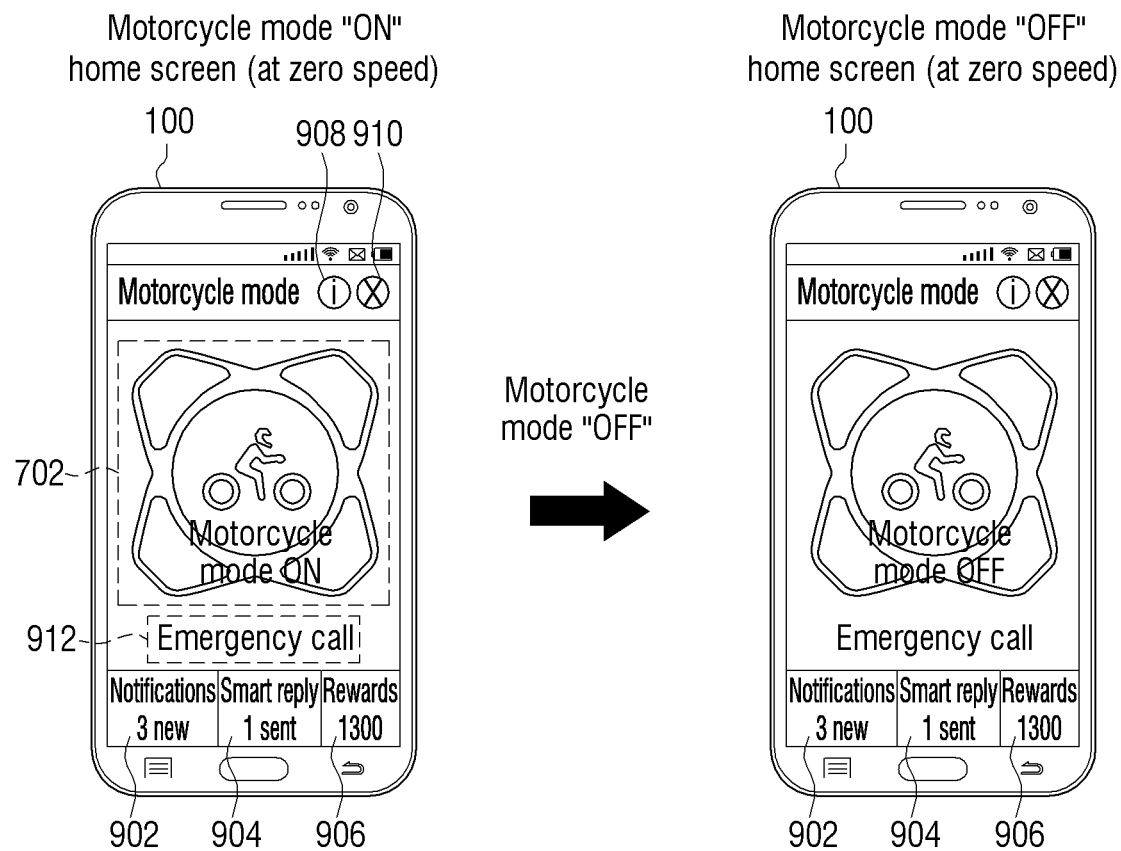
FIG. 9 shows an example in which a motorcycle mode "ON" home screen and a motorcycle mode "OFF" home screen are displayed, according to an exemplary embodiment.

FIG. 9 shows an example in which the motorcycle mode "ON" home screen and the motorcycle mode "OFF" home screen are displayed when the speed of the motorcycle is zero, according to an exemplary embodiment. As shown in FIG. 9, the motorcycle mode "ON" home screen or the motorcycle mode "OFF" home screen are visible only when the below mentioned conditions are met such as:

a. When the speed of the motorcycle is zero, the motion lock 704 is "OFF", and the motorcycle mode is inactive; or b. When the user accesses an "OFF" state motorcycle mode home screen by pressing the quick panel icon.

The different control tabs and status notifiers are displayed on the home screen are described below:

As shown in FIG. 9, Notifications tab 902 indicates the urgent unattended call notifications. Further, the Notifications tab 902 is always in an "ON" state. When the motorcycle mode is "OFF" then the Notifications tab 902 enters into an "OFF" state. A Smart reply tab 904 may be in the "ON" state or the "OFF" state depending on the user. In case if it is in the "ON" state then, the Smart reply tab 904 indicates a number of messages sent to the contacts listed in the priority list. When the motorcycle mode is "OFF" then, the Smart reply tab 904 enters into the "OFF" state. A Rewards tab 906 may be in the "ON" state or the "OFF" state. If the Rewards tab 906 is in the "ON" state then, it indicates a total unredeemed points earned by the user. Further, if the motorcycle mode is "OFF" then, the Rewards tab 906 may be in the "OFF" state.

As shown in FIG. 9, an About tab 908 can redirect the user to ABOUT page and can inform the user about the features and its capabilities. A Settings tab 910 redirects the user to SETTINGS page and allows the user to edit their basic details and customize the feature. An emergency call tab 912 redirects the user to an emergency dialer screen.

Figure 10A:
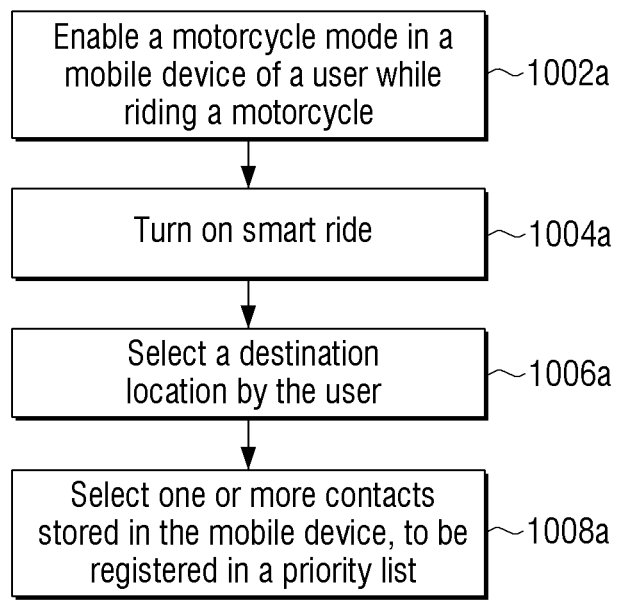
FIG. 10A is a flow chart illustrating a method for registering contacts stored in a mobile device in a priority list, according to an exemplary embodiment.

FIG. 10A is a flow chart illustrating a method for registering the contacts stored in the mobile device 100 in the priority list, according to an exemplary embodiment. At operation 1002a, the method includes enabling the motorcycle mode in the mobile device 100 of the user while riding the motorcycle. The method allows the mode controller 102 to enable the motorcycle mode in the mobile device 100 of the user while riding the motorcycle.

At operation 1004a, the method includes turning on a smart ride. The method allows the mode controller 102 to turn on the smart ride. At operation 1006a, the method includes selecting the destination by the user. The method allows the mode controller 102 to select the destination by the user. At operation 1008a, the method includes selecting the contacts stored in the mobile device 100, to be registered in the priority list (i.e., indicating the contacts as the priority callers). The method allows the mode controller 102 to select the contacts stored in the mobile device 100, to be registered in the priority list.

Figure 10B:
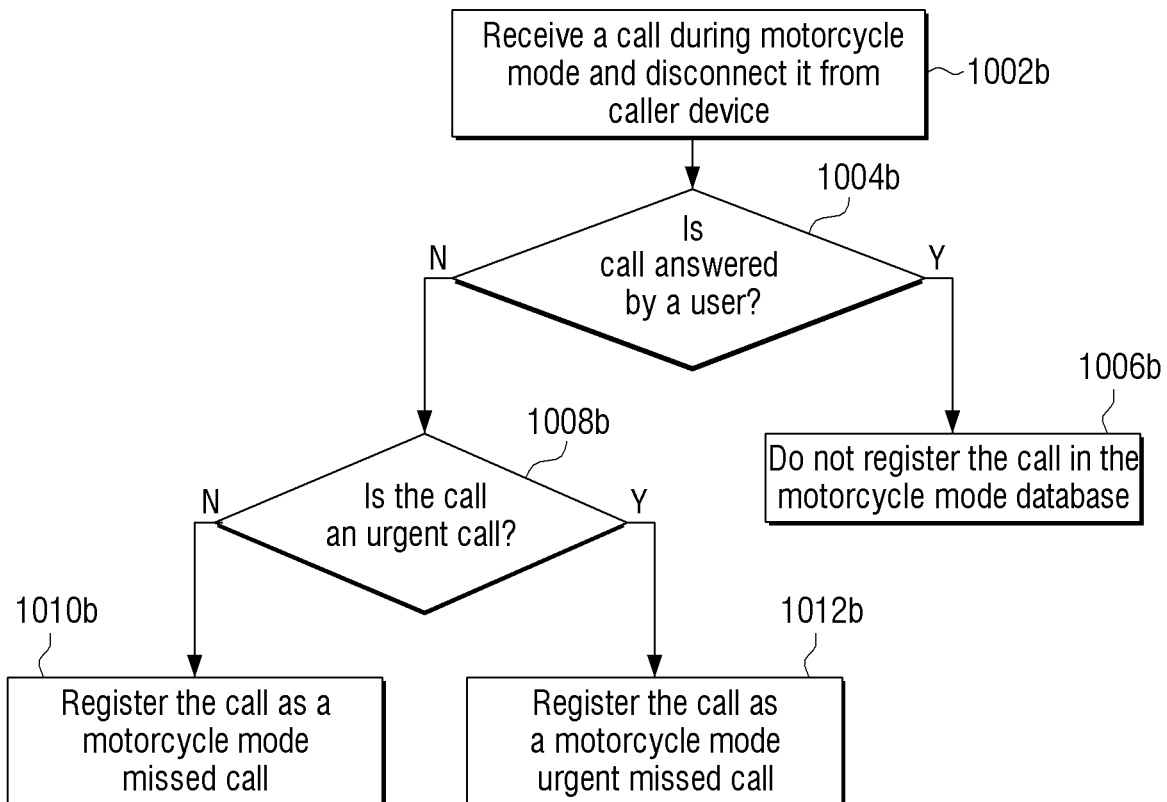
FIG. 10B is a flow chart illustrating a method for creating a motorcycle mode database, according to an exemplary embodiment.

FIG. 10B is a flow chart illustrating a method for creating the motorcycle mode database 206b, according to an exemplary embodiment. At operation 1002b, the method includes receiving the call while the motorcycle mode is enabled and disconnecting the call at the caller device. The method allows the mode controller 102 to receive the call while the motorcycle mode is enabled and disconnect the call at the caller device.

At operation 1004b, if it is determined that the call is answered by the user then, at operation 1006b, the method includes not registering the call in the motorcycle mode database 206b. The method allows the mode controller 102 to not to register the call in the motorcycle mode database 206b. At operation 1004b, if it is determined that the call is unanswered by the user then, at operation 1008b, the method includes determining whether the call is the urgent incoming call. The method allows the motorcycle mode controller 102 to determine whether the call is the urgent incoming call.

At operation 1008b, if it is determined that the call is not the urgent incoming call then, at operation 1010b, the method includes registering the call as a motorcycle mode missed call. The method allows the mode controller 102 to register the call as the motorcycle mode missed call. At operation 1008b, if it is determined that the call is the urgent incoming call then, at operation 1012b, the method includes registering the call as a motorcycle mode urgent missed call.

The various actions, acts, blocks, steps, or the like in the flow charts in FIGS. 10A and 10B may be performed in the order presented, in a different order or simultaneously. Further, in some exemplary embodiments, some of the actions, acts, blocks, steps, or the like may be omitted, added, modified, skipped, or the like without departing from exemplary embodiments.

Figure 11A:
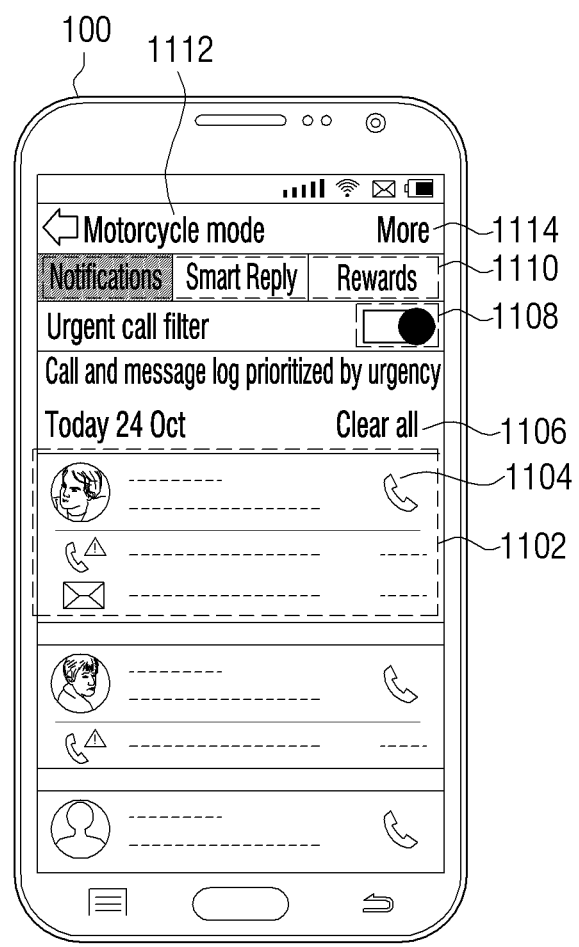
FIG. 11A shows an example of a motorcycle mode "ON" notification screen, according to an exemplary embodiment.

FIG. 11A shows an example in which the motorcycle mode "ON" notification screen is depicted when the speed of the motorcycle is zero, according to an exemplary embodiment. As shown in FIG. 11A, the motorcycle mode "ON" notification screen is visible only when the below mentioned conditions are met such as:

a. When the speed of the motorcycle is zero, the motion lock 704 is "OFF", and the motorcycle mode is inactive; or b. When the user accesses the "OFF" state motorcycle mode home screen by long pressing the quick panel icon.

The different options available to the user on the motorcycle mode "ON" notification screen are described below:

As shown in FIG. 11A, an urgent call and message notifications card(s) 1102 is ordered as per urgency of the call. The urgent call and message notifications card 1102 may be dismissed by swiping to right by the user. Further, a call button 1104 may be tapped by the user to initiate the call to the caller. In an example, the motorcycle mode is turned off, in case the user continues to ride the motorcycle while on the call.

As shown in FIG. 11A, a Clear all 1106 tap (i.e., option provided to the user) may be tapped by the user to delete the urgent call and message notifications card 1102. An urgent call filter toggle switch 1108 is automatically enabled when the motorcycle mode is enabled (i.e., "ON").

As shown in FIG. 11A, the Smart reply and Rewards tabs 1110 are scrollable tabs in which the user can select the Smart reply tab or the Rewards tab to navigate to their corresponding home screens. A return to motorcycle mode home screen 1110, in case the urgent call filter toggle switch 1108 is "ON", may be used to navigate the user to the motorcycle mode "ON" home screen as shown in FIG. 9. Further, the return to motorcycle mode home screen 1110, in case the urgent call filter toggle switch 1108 is "OFF", may be used to navigate the user to the motorcycle mode "OFF" home screen as shown in FIG. 9. An overflow menu (i.e., More 1114) may be tapped by the user to expand and display additional options (i.e., sort by: About or Settings) to the user as shown in FIG. 11C.

Figure 11B:
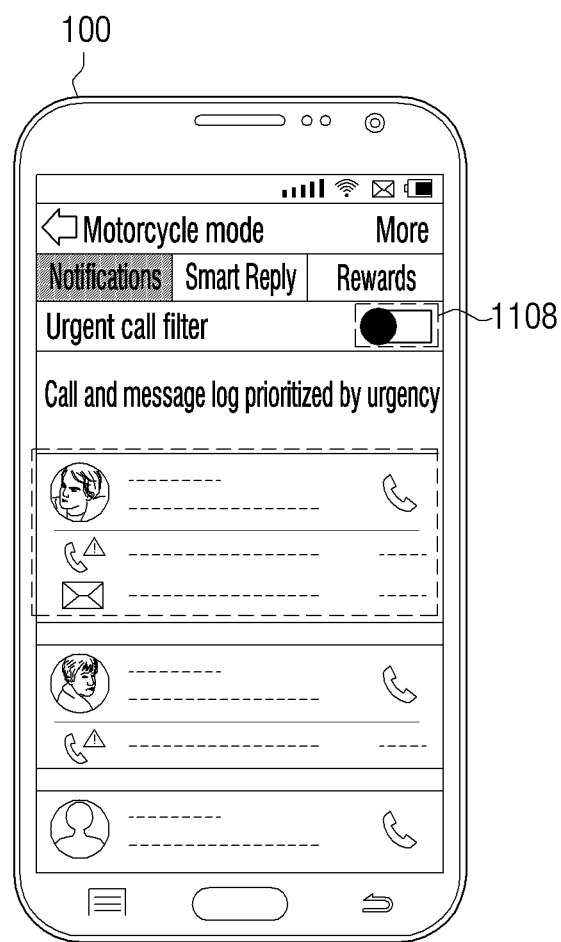
FIG. 11B shows an example of a motorcycle mode "OFF" notification screen, according to an exemplary embodiment.

FIG. 11B shows an example in which the motorcycle mode "OFF" notification screen is depicted, according to an exemplary embodiment. As shown in FIG. 11B, by disabling the urgent call filter toggle switch 1108, the user is prompted that the motorcycle mode shall disable and enter into the "OFF" state.

Figure 11C:
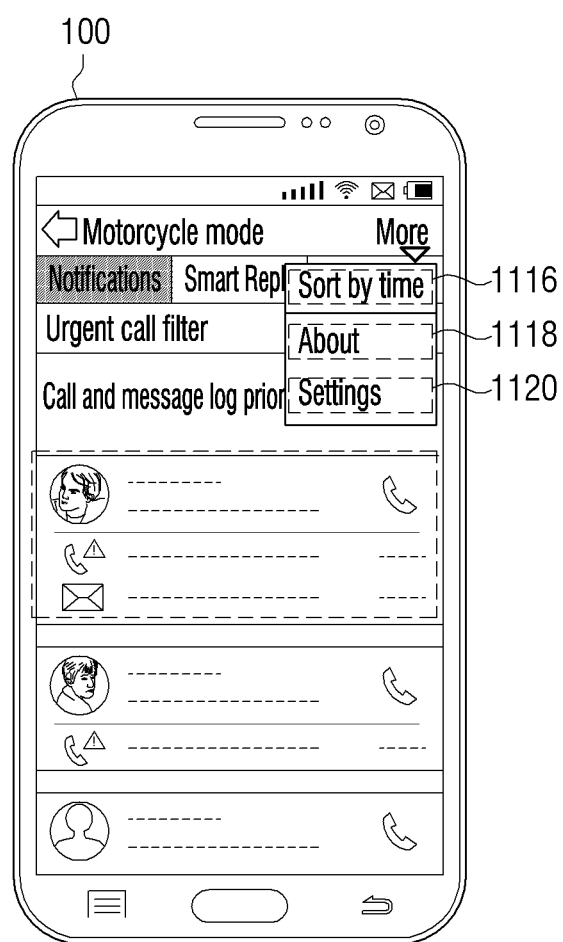
FIG. 11C shows an example of a motorcycle mode notifications screen overflow menu, according to an exemplary embodiment.

FIG. 11C shows an example in which the motorcycle mode notifications screen overflow menu is depicted, according to an exemplary embodiment. As shown in FIG. 11C, a Sort by time 1116 may be tapped by the user to rearrange the notifications according to time. The user can tap on the About 1118 and the Settings 1120 to access different options which are included in the same.

Figure 12:
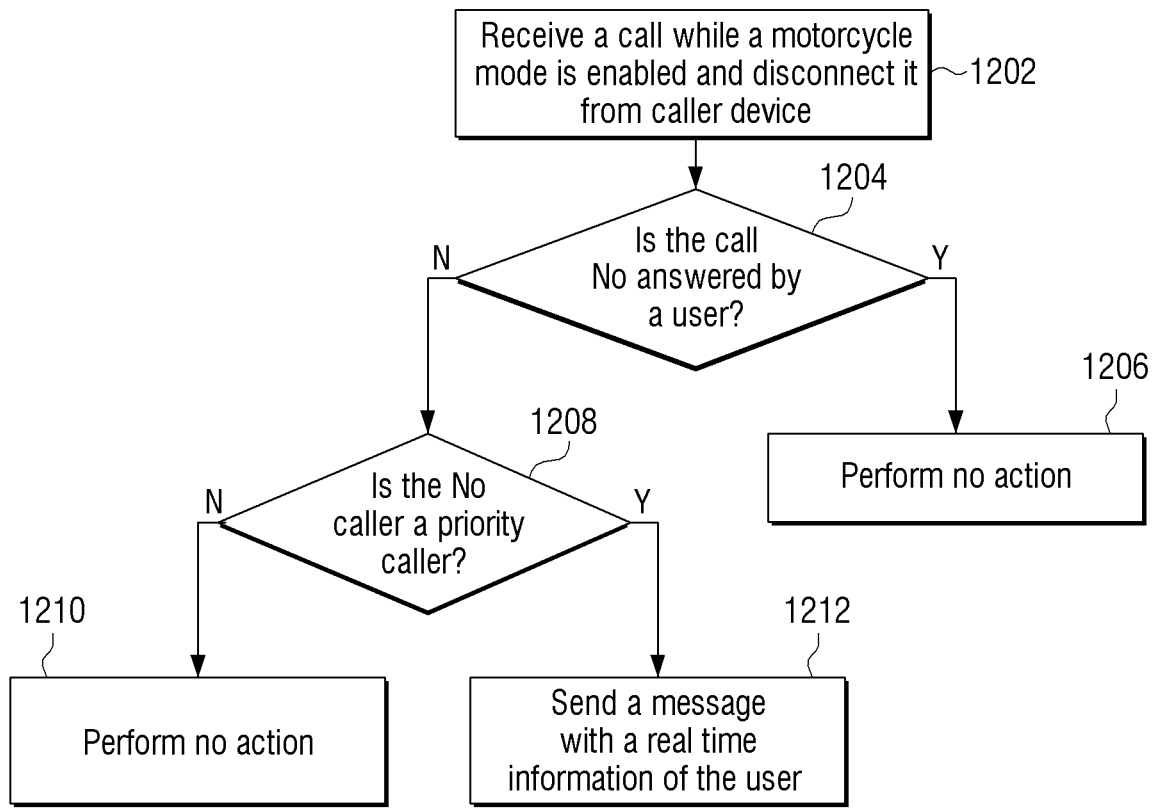
FIG. 12 is a flow chart illustrating a method for sending a message to a caller while a user is riding a motorcycle, according to an exemplary embodiment.

FIG. 12 is a flow chart illustrating a method for sending the message to the caller (i.e., eliciting the response message at the caller device), while the user is riding the motorcycle, according to an exemplary embodiment. At operation 1202, the method includes receiving the call while the motorcycle mode is enabled and disconnecting the call at the caller device. The method allows the motorcycle mode controller 102 to receive the call while the motorcycle mode is enabled and disconnecting the call at the caller device.

At operation 1204, if it is determined that the call is answered by the user then, at operation 1206, the method includes performing no operation of the mobile device 100. The method allows the mode controller 102 to perform no operation of the mobile device 100. At operation 1204, if it is determined that the call is unanswered by the user then, at operation 1208, the method includes determining whether the caller is in the priority list. The method allows the mode controller 102 to determine whether the caller is in the priority list.

At operation 1208, if it is determined that the caller is not part of the priority list then, at operation 1210, the method includes performing no operation. The method allows the mode controller 102 to perform no operation. At operation 1208, if it is determined that the caller is part of the priority list then, at operation 1212, the method includes sending the message to the caller. The method allows the mode controller 102 to send the message to the caller. In an example, the message includes the location of the user, the estimated time to reach the destination by the user, or combination of same.

The various actions, acts, blocks, steps, or the like in the flow chart of FIG. 12 may be performed in the order presented, in a different order or simultaneously. Further, in some exemplary embodiments, some of the actions, acts, blocks, steps, or the like may be omitted, added, modified, skipped, or the like without departing from exemplary embodiments.

Figure 13:
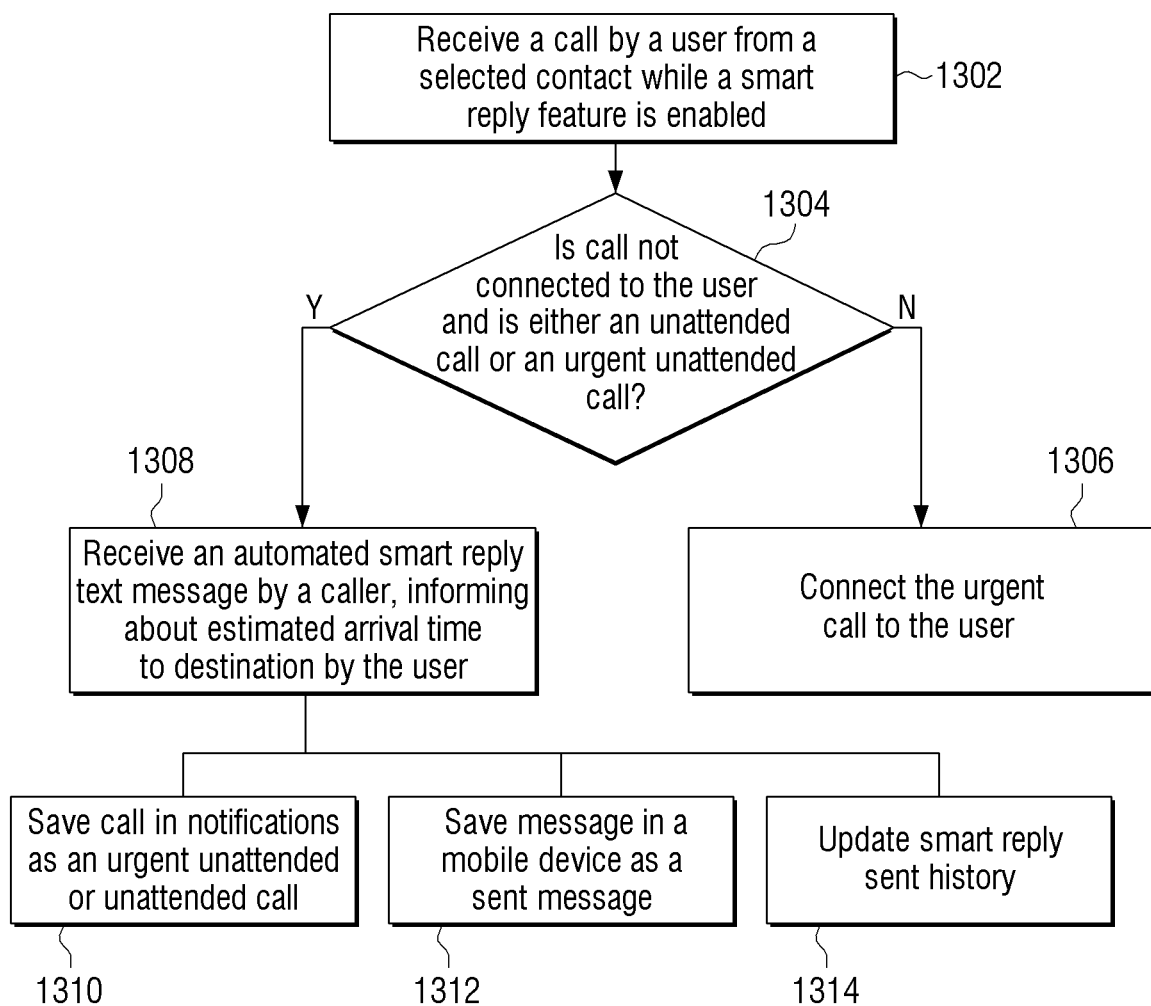
FIG. 13 is a flow chart illustrating a method for performing at least one operation when a smart reply feature is enabled in a mobile device while a user is riding a motorcycle, according to an exemplary embodiment.

FIG. 13 is a flow chart illustrating a method for performing the operation when the smart reply feature is enabled in the mobile device while the user is riding the motorcycle, according to an exemplary embodiment. At operation 1302, the method includes receiving the call by the user from the contact stored in the mobile device 100 when the smart reply feature is enabled. The method allows the mode controller 102 to receive the call by the user from the contact stored in the mobile device 100 when the smart reply feature is enabled.

At operation 1304, if it is determined that the call is connected to the user and the call is the unattended call or the urgent unattended call, at operation 1306, the method includes connecting the urgent call to the user. The method allows the mode controller 102 to connect the urgent call to the user. At operation 1304, if it is determined that the call is not connected to the user and the call is the unattended call or the urgent unattended call, at operation 1308, the method includes sending an automated smart reply text message to the caller, informing about the estimated time to reach the destination by the user. The method allows the mode controller 102 to send the automated smart reply text message to the caller, informing about the estimated time to reach the destination by the user.

At operations 1310, 1312, and 1314, the method includes saving the call in the notifications 902 as the urgent unattended or unattended call, the message in the mobile device 100 as the sent message, and updating the sent history of the smart reply 904. The method allows the mode controller 102 to save the call in the notifications 902 as the urgent unattended or unattended call, the message in the mobile device 100 as the sent message, and update the sent history of the Smart reply tab 904. In an example, the history of the messages sent is stored for a single session, as described below with reference to FIG. 15.

The various actions, acts, blocks, steps, or the like in the flow chart of FIG. 13 may be performed in the order presented, in a different order or simultaneously. Further, in some exemplary embodiments, some of the actions, acts, blocks, steps, or the like may be omitted, added, modified, skipped, or the like without departing from exemplary embodiments.

Figure 14:
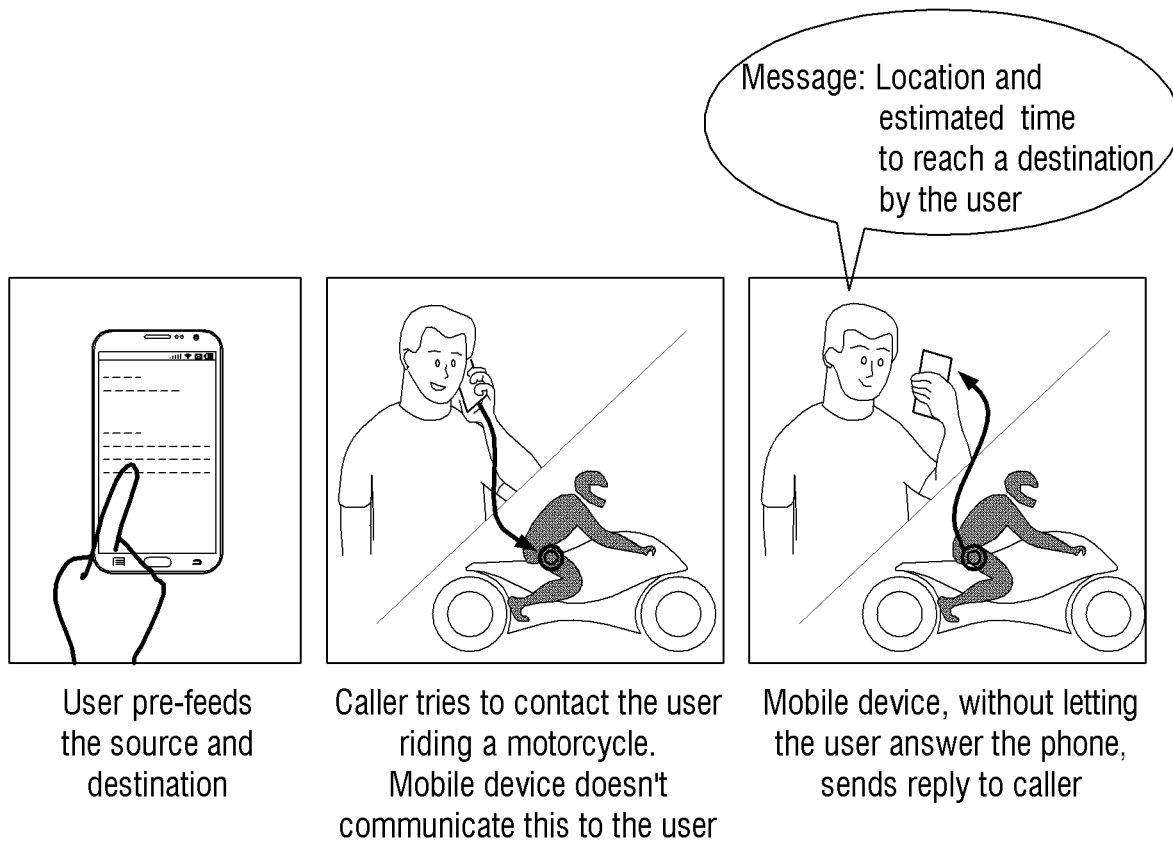
FIG. 14 shows an example in which a message is sent to a caller when a user is riding a motorcycle, according to an exemplary embodiment.

FIG. 14 shows an example in which the message is sent to the caller when the user is riding the motorcycle, according to an exemplary embodiment. Initially, the user of the mobile device 100 pre-feeds the source and destination. In this scenario, the mode controller 102 receives the incoming call from the caller device while the user is riding the motorcycle. After receiving the call, the mode controller 102 determines the speed of the motorcycle as the context of the motorcycle and the user. The motorcycle mode controller 102 detects that the speed of the motorcycle exceeds the speed threshold. If the speed exceeds the speed threshold then, the message is sent to the caller. In an exemplary embodiment, the message includes the location of the user, the estimated time to reach the destination by the user, or combination of same as shown in FIG. 14.

Figure 15:
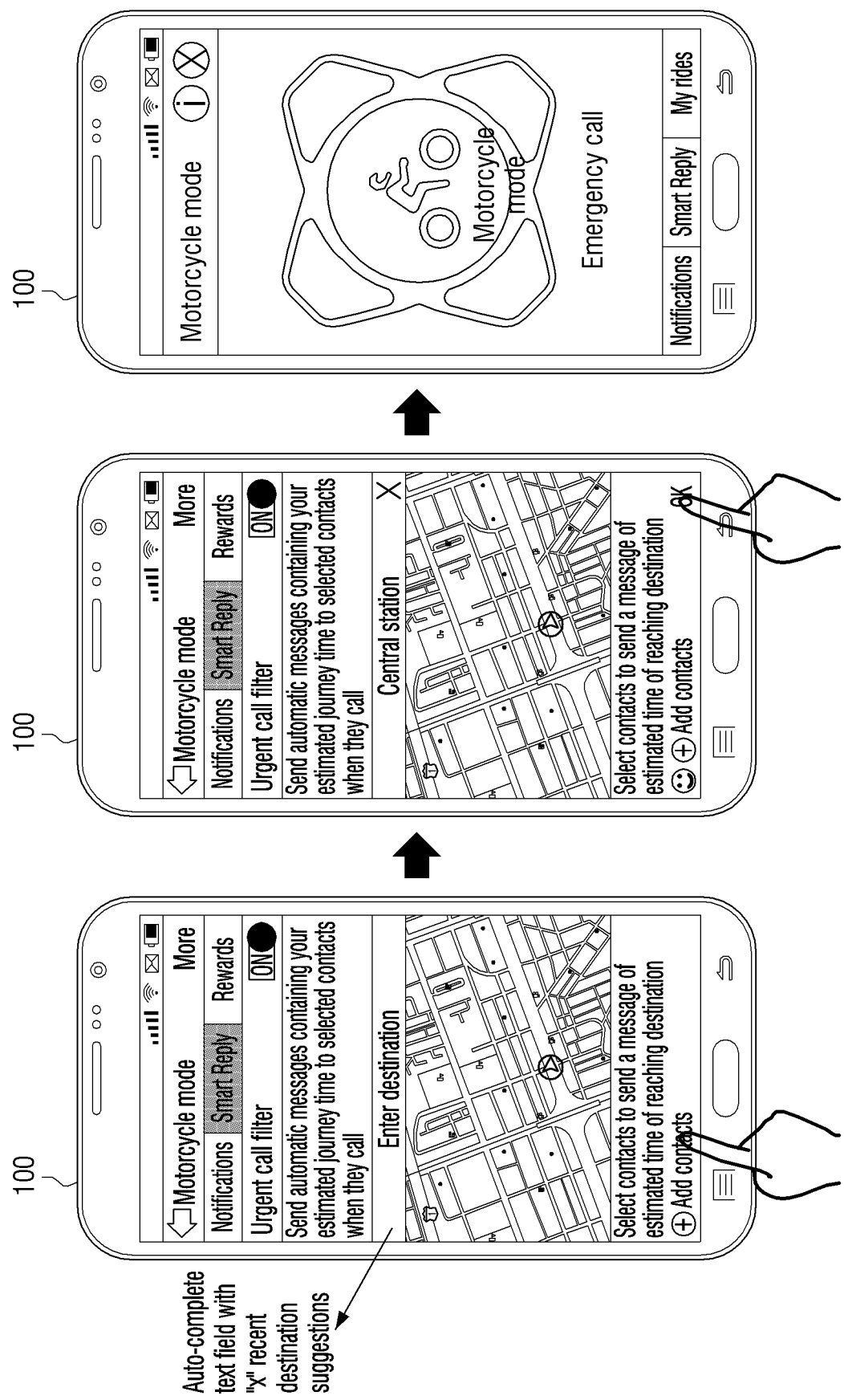
FIG. 15 shows an example in which a motorcycle mode "ON" smart reply screen is depicted for selecting contacts to send a message, according to an exemplary embodiment.

FIG. 15 shows an example in which the motorcycle mode "ON" smart reply screen is depicted for selecting the contacts to send the message, according to an exemplary embodiment. As shown in FIG. 15, an enter destination field is an auto-complete text field with "x" (for example: 5) recent destination suggestions. The user can select the contact for sending the message while the user is riding the motorcycle. After selecting the contact for sending the message, the motorcycle mode "ON" smart reply screen is displayed on the mobile device 100.

Figure 16A:
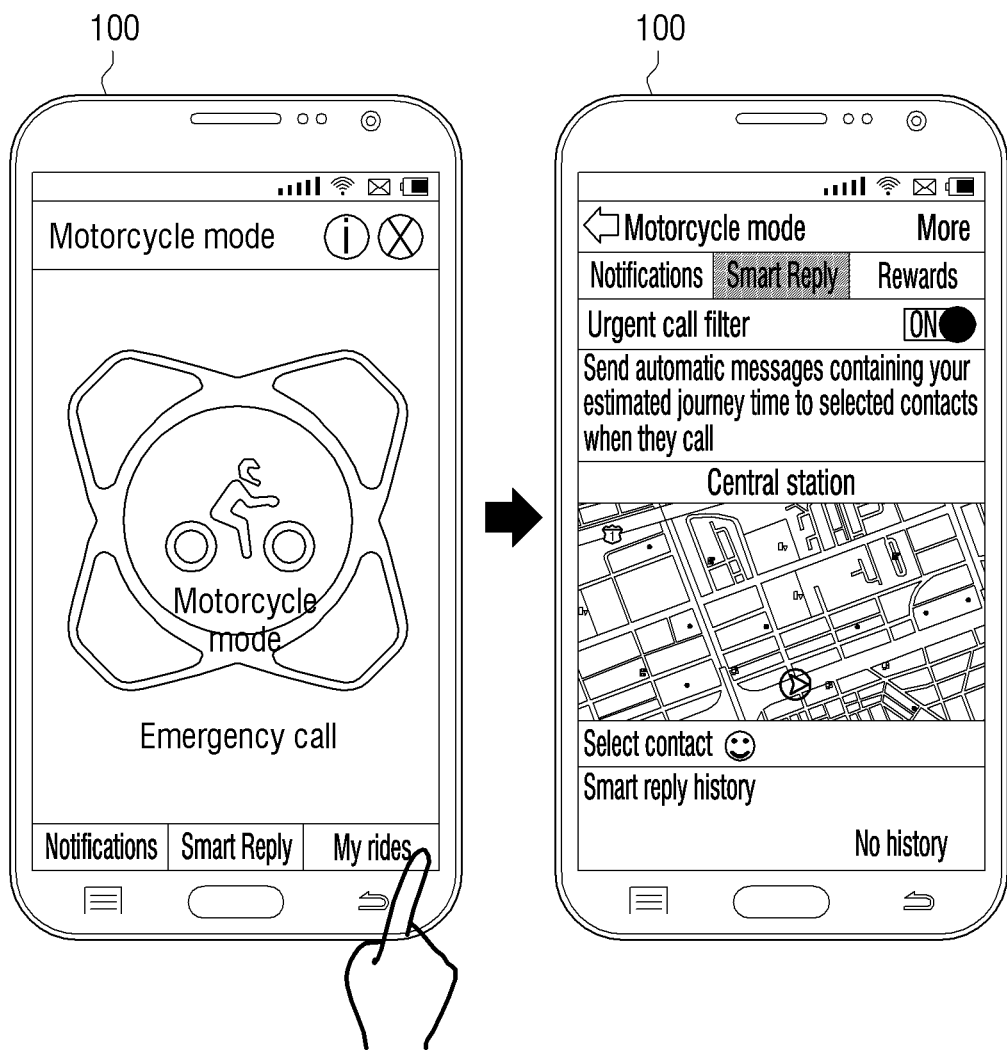
FIG. 16A shows an example in which a motorcycle mode Smart reply "ON" home screen is displayed when a user selects a Smart reply feature, according to an exemplary embodiment.

FIG. 16A shows an example in which the motorcycle mode Smart reply "ON" home screen is displayed when the user selects the Smart reply feature, according to an exemplary embodiment. As shown in FIG. 16A, the user of the mobile device 100 selects the Smart reply feature to view the Smart reply history. The user is displayed with no history as no messages were sent to the selected contacts in the mobile device 100.

Figure 16B:
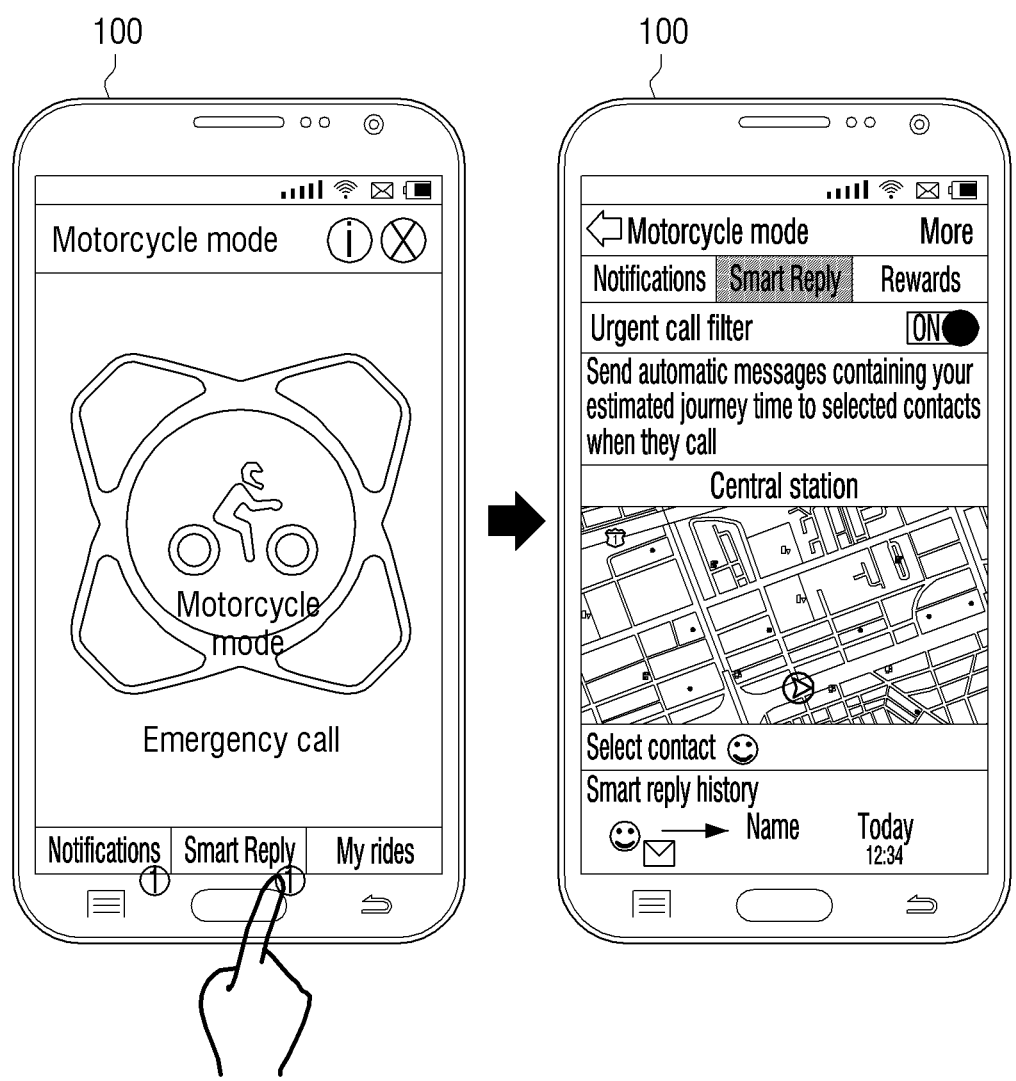
FIG. 16B shows an example in which a motorcycle mode Smart reply "ON" home screen is displayed when a user selects a Smart reply feature, according to an exemplary embodiment.

FIG. 16B shows an example in which the motorcycle mode Smart reply "ON" home screen is displayed when the user selects the Smart reply feature, according to an exemplary embodiment. As shown in FIG. 16B, the user of the mobile device 100 selects the Smart reply feature to view the Smart reply history. The user is displayed with the history of the message including time at which the message is sent to the contacts.

Figure 17A:
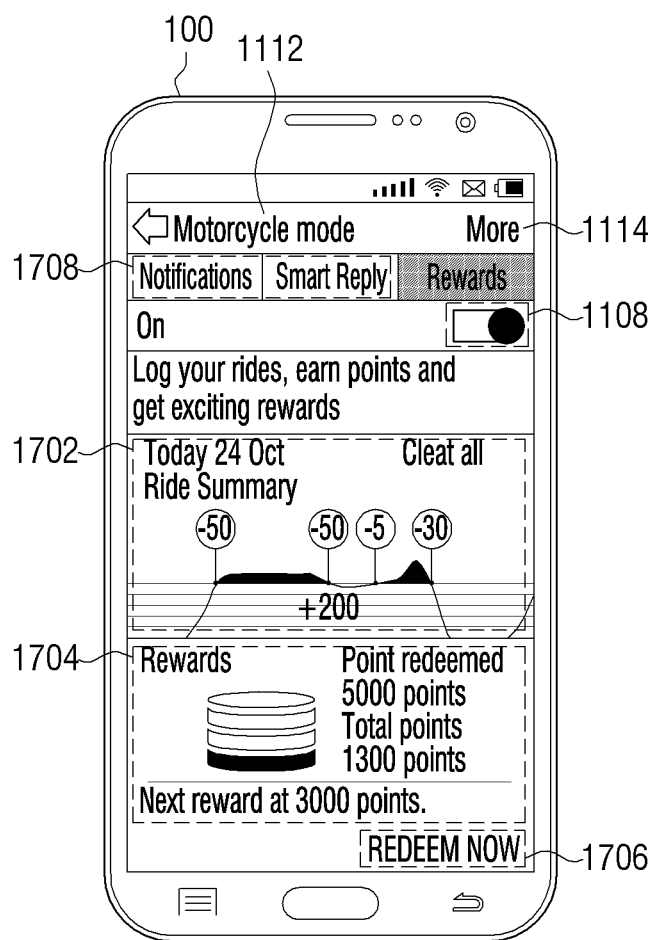
FIG. 17A shows an example of a motorcycle mode "ON" rewards screen, according to an exemplary embodiment.

FIG. 17A shows an example in which the motorcycle mode "ON" rewards screen is depicted when the motorcycle speed is zero, according to an exemplary embodiment. As shown in FIG. 17A, the motorcycle mode "ON" rewards screen is visible only when the below mentioned conditions are met such as:

a. When the speed of the motorcycle is zero, the motion lock 704 is "OFF", and the motorcycle mode is inactive; or b. When the user accesses the "OFF" state motorcycle mode home screen by long pressing the quick panel icon.

The different options available to the user on the motorcycle mode "ON" rewards screen are described here. As shown in FIG. 17A, Ride summary 1702 indicates dynamic horizontal scroll timeline and a graph depicting points earned and lost during an active ride. Further, Rewards 1704 indicates the point's summary such as Earned, Redeemed, and Points required for next reward; and a dynamic graph depicting the points required to the next reward. The Redeem 1706 is activated once the user achieves minimum points required for the reward. The notifications and smart reply tabs 1708 are scrollable tabs in which the user can select the notifications tab or the smart reply tab to navigate to their corresponding home screens. The urgent call filter toggle switch 1108, the motorcycle mode home screen 1112, and the overflow menu (i.e., More 1114) are described with reference to FIGS. 11A and 11B.

Figure 17B:
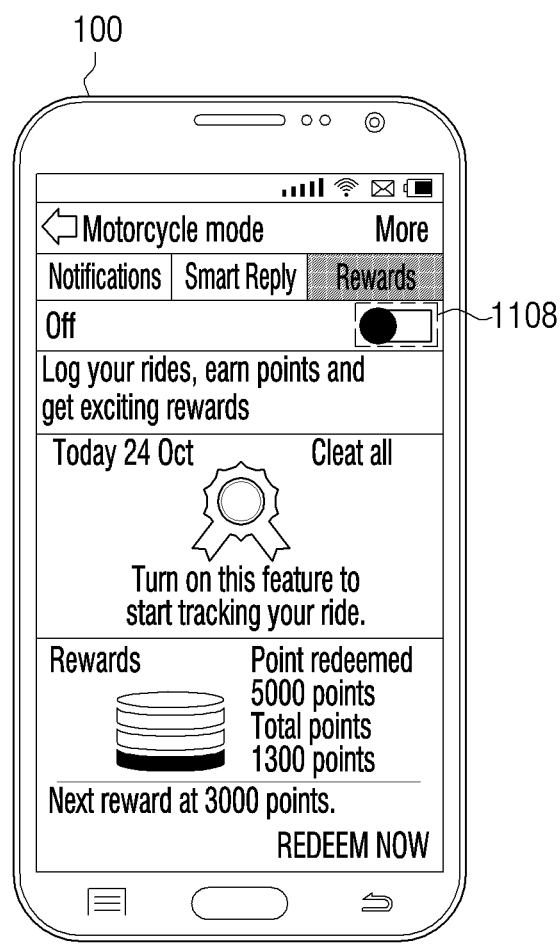
FIG. 17B shows an example of a motorcycle mode "OFF" rewards screen, according to an exemplary embodiment.

FIG. 17B shows an example in which the motorcycle mode "OFF" rewards screen is depicted, according to an exemplary embodiment. As shown in FIG. 17B, by disabling the urgent call filter toggle switch 1108, the user is prompted that the motorcycle mode shall disable and enter into the "OFF" state.

Figure 17C:
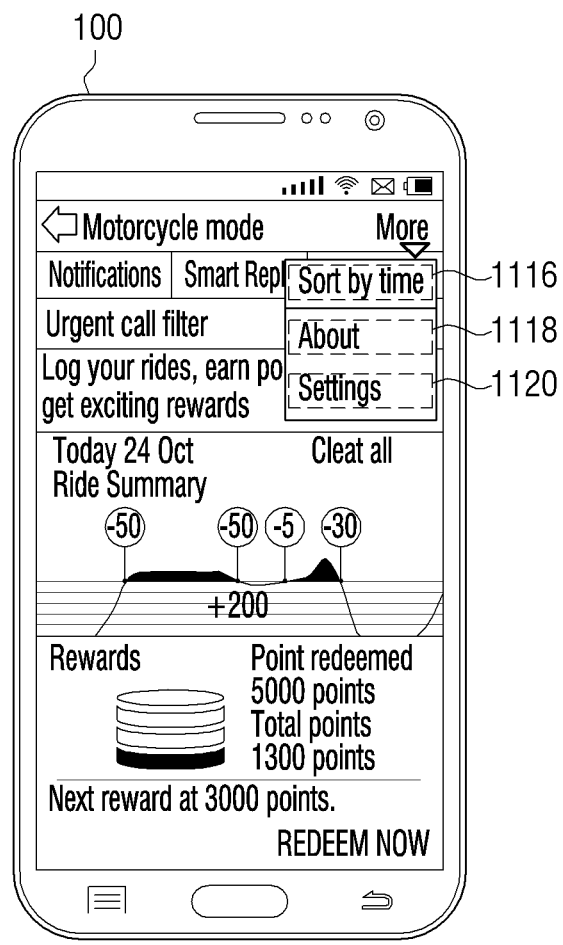
FIG. 17C shows an example of a motorcycle mode rewards screen overflow menu, according to an exemplary embodiment.

FIG. 17C shows an example in which the motorcycle mode rewards screen overflow menu is depicted, according to an exemplary embodiment. The Sort by time 1116, the About 1118, and the Settings 1120 are described with reference to FIG. 11C.

Figure 18A:
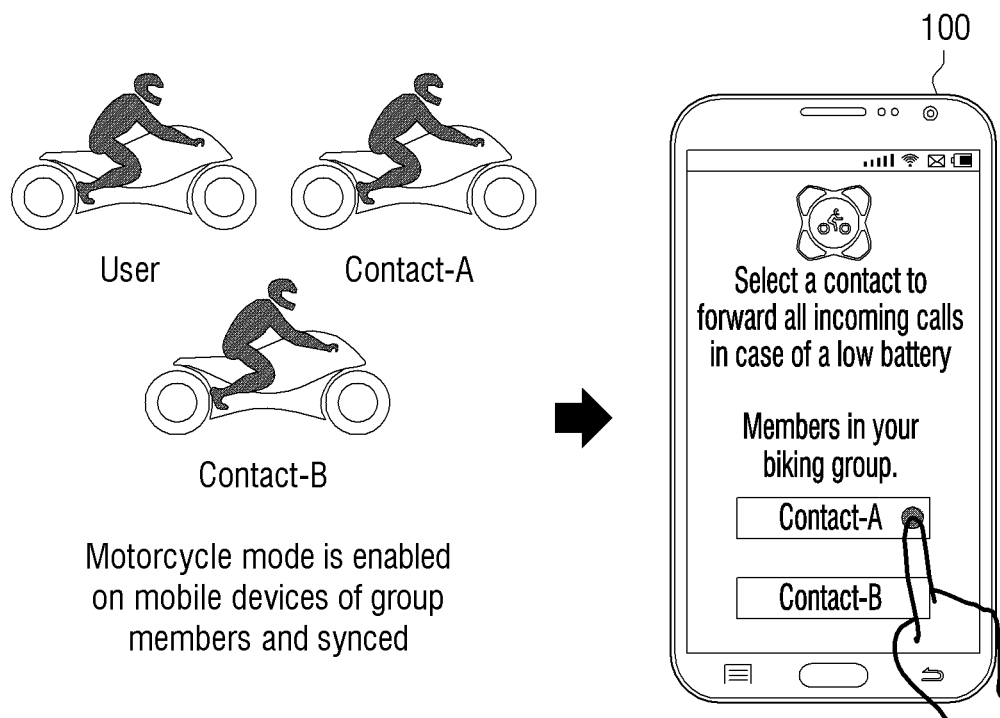
FIG. 18A shows an example in which a Contact-A from motorcycle group members list is selected to forward incoming calls, according to an exemplary embodiment.

FIG. 18A shows an example in which a Contact-A from motorcycle group members list is selected to forward the incoming calls if the battery level of the mobile device is within the battery threshold and the motorcycle mode is enabled, according to an exemplary embodiment. As an example, the user of the mobile device 100 is part of the motorcycle group members (i.e., the Contact-A and a Contact-B available in the mobile device 100) as shown in FIG. 18A.

Initially, the motorcycle mode is enabled in mobile devices (including the mobile device 100 of the user) of the motorcycle group members and synched with each other. Further, as shown in FIG. 18A, the user selects the Contact-A from the motorcycle group members to forward all the incoming calls in case the battery of the mobile device 100 is low.

Figure 18B:
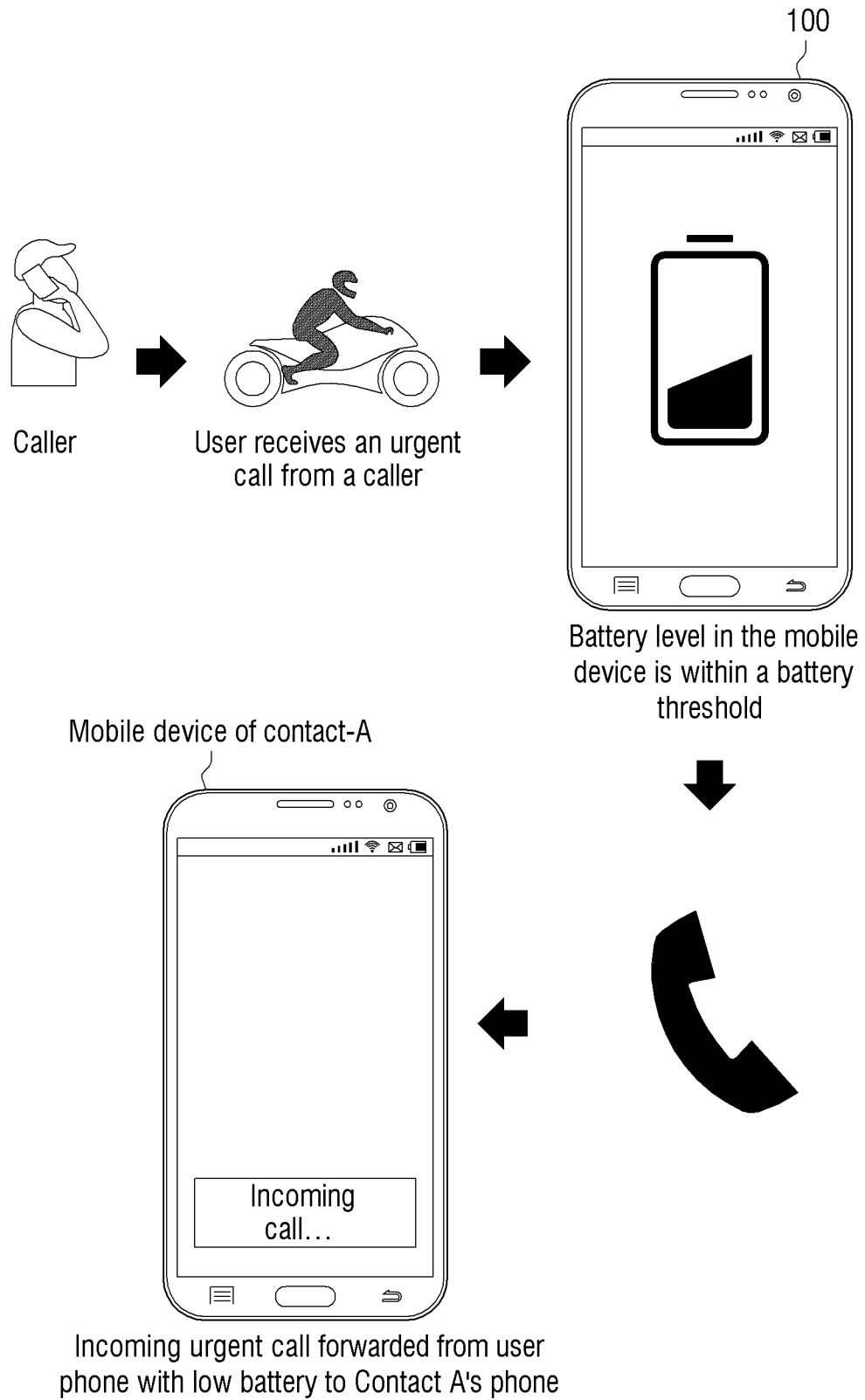
FIG. 18B shows an example in which an operation is performed to automatically forward an incoming call to a Contact-A associated with a user, according to an exemplary embodiment.

FIG. 18B shows an example in which the operation is performed to automatically forward the incoming call to the Contact-A associated with the user if the battery level of the mobile device 100 is within the battery threshold, according to an exemplary embodiment. In an example, the user of the mobile device 100 receives the urgent incoming call from the caller while the user is riding the motorcycle as shown in FIG. 18B. After receiving the urgent incoming call from the caller, the mode controller 102 determines the battery level of the mobile device 100 as the context of the motorcycle and the user.

Further, the mode controller 102 determines the battery level of the mobile device 100 is within the battery threshold (i.e., the battery of the mobile device 100 is low). After determining that the battery of the mobile device 100 is low, the mode controller 102 forwards the urgent incoming call to the mobile device of the Contact-A as shown in FIG. 18B.

Figure 19:
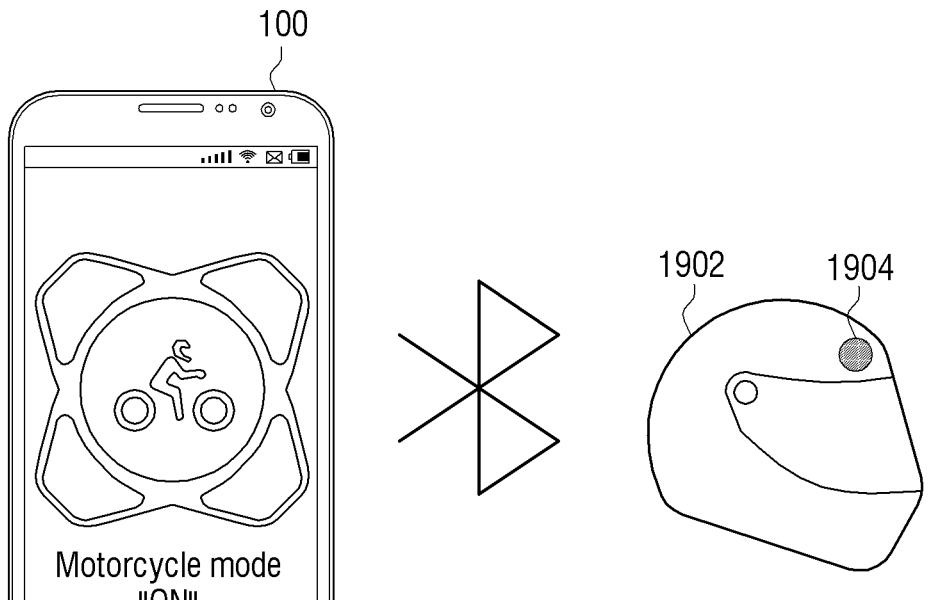
FIG. 19 shows an example in which a message is sent to contact(s) associated with a user, according to an exemplary embodiment.
Figure 19:
Figure 19:
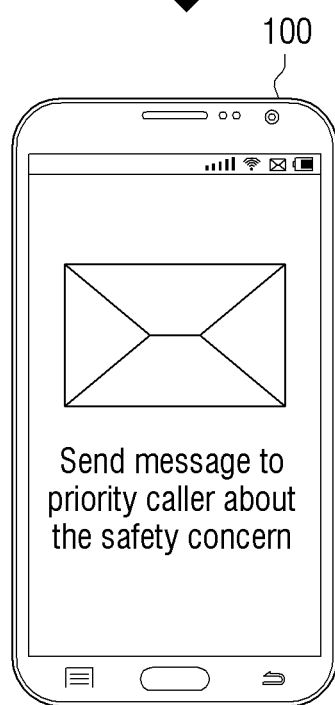

FIG. 19 shows an example in which the message is sent to the contact(s) associated with the user after determining that the smart helmet is not worn by the user of the motorcycle or not paired with the mobile device, according to an exemplary embodiment. Initially, the mobile device 100 is paired with the smart helmet 1902 of the user. In an example, the mobile device 100 pairs with the smart helmet 1902 based on proximity of the smart helmet 1902 with respect to the mobile device 100 or detecting head movement of the user using the sensor 1904, e.g., a proximity sensor, on the smart helmet 1902.

As shown in FIG. 19, the mode controller 102 detects that the motorcycle mode is enabled. The motorcycle mode controller 102 determines the speed of the motorcycle as the context of the motorcycle and detects that the speed exceeds the speed threshold. Further, the mode controller 102 detects whether the smart helmet 1902 is worn by the user as the context of the user. If the smart helmet 1902 is not worn by the user or paired with the mobile device 100 then, the message is automatically sent to the at least one contact associated with the user.

Figure 20:
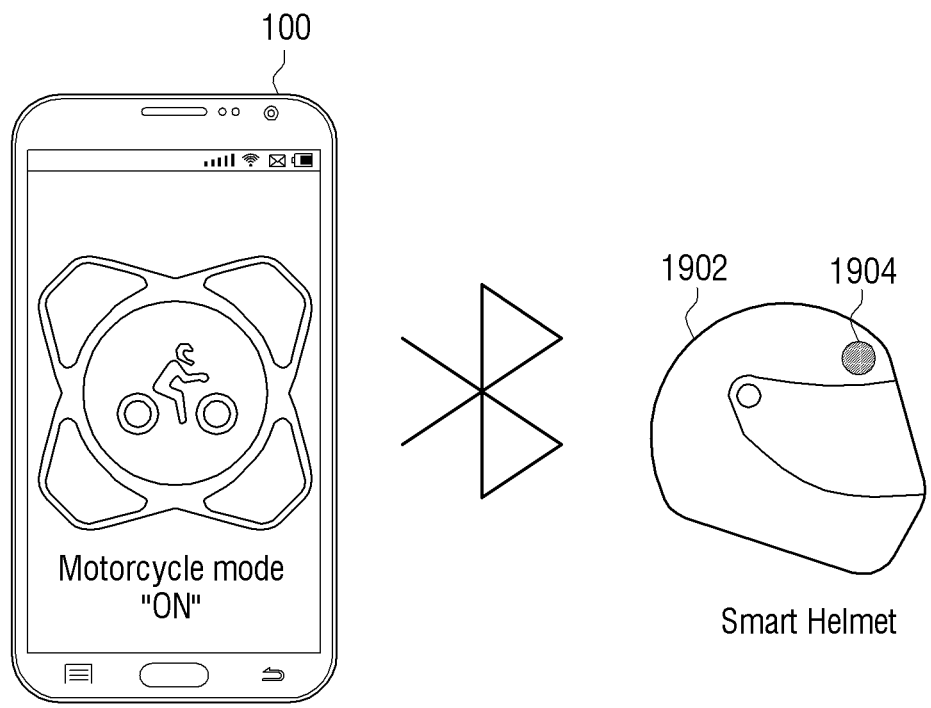
FIG. 20 shows an example in which a voice notification is sent to a smart helmet after receiving a call from a Contact-A, according to an exemplary embodiment.
Figure 20:
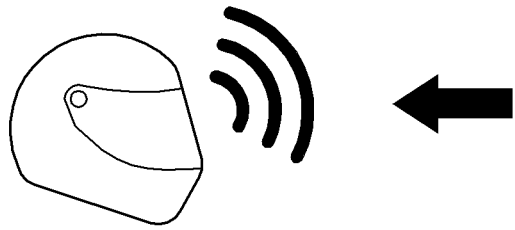
Figure 20:
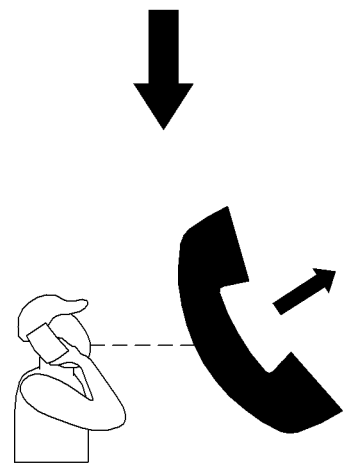

FIG. 20 shows an example in which the voice notification (i.e., incoming call notification) is sent to the smart helmet after receiving the call from the Contact-A (i.e., white-list contact), according to an exemplary embodiment. Initially, as shown in FIG. 20, the mobile device 100 is paired with the smart helmet 1902 of the user. The user creates a white-list for certain contacts. Here, the user creates the Contact-A as the white-list contact.

As shown in an example of FIG. 20, the user receives the call from the Contact-A. All other call received from other contacts associated with the user is filtered for the urgent calls. After receiving the call from the white-listed contact i.e., the Contact-A, the user receives the voice notification in the smart helmet 1902 indicating the user about the incoming call (i.e., Contact-A calling, stop the motorcycle to answer the incoming call).

Figure 21:
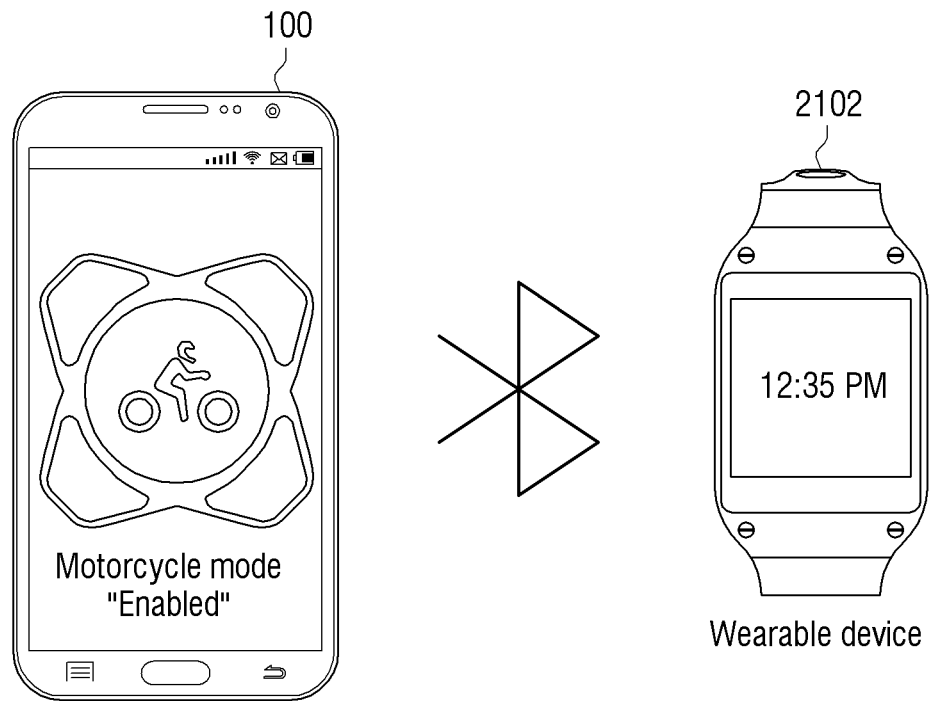
FIG. 21 shows an example in which an incoming call notification is elicited on a screen of a wearable device after receiving a call from a Contact-A, according to an exemplary embodiment.
Figure 21:
Figure 21:
Figure 21:
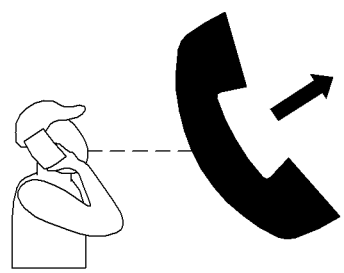

FIG. 21 shows an example in which the incoming call notification is elicited on the screen of the wearable device after receiving the call from the Contact-A (i.e., white-list contact), according to an exemplary embodiment. Initially, as shown in FIG. 21, the mobile device 100 is paired with the wearable device 2102 of the user. The user creates a white-list for certain contacts. Here, the user creates the Contact-A as the white-list contact.

As shown in an example of FIG. 21, the user receives the call from the Contact-A. All other call received from other contacts associated with the user is filtered for the urgent calls. After receiving the call from the white-listed contact i.e., the Contact-A, the user receives the incoming call notification on the screen of the wearable device 2102 indicating the user about the incoming call. The incoming call notification may be elicited on the screen of the smart mirror of the motorcycle paired with the mobile device 100.

Figure 22:
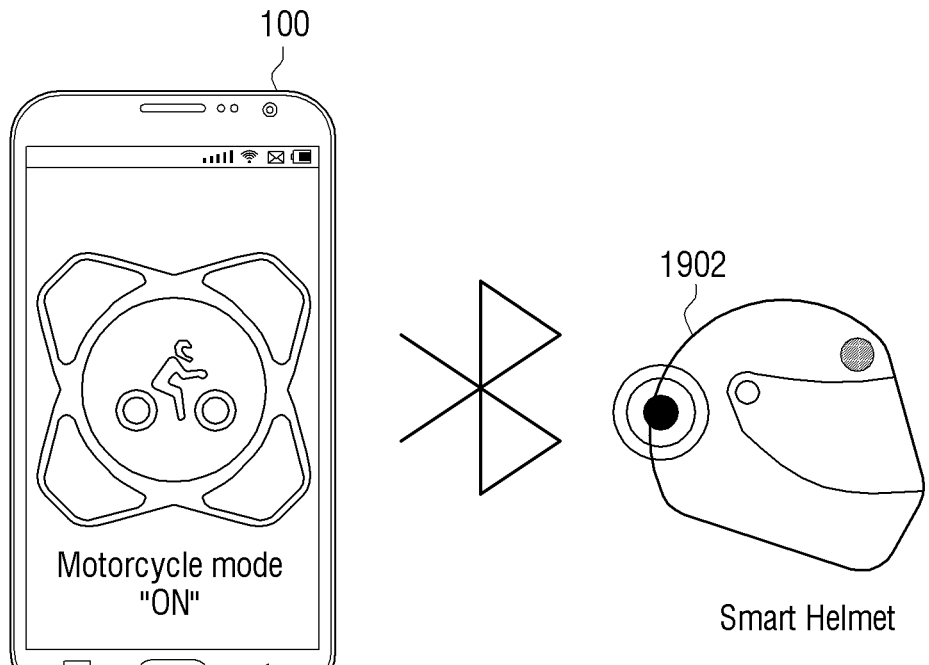
FIG. 22 shows an example in which a message is automatically sent to a contact associated with a user, according to an exemplary embodiment.
Figure 22:
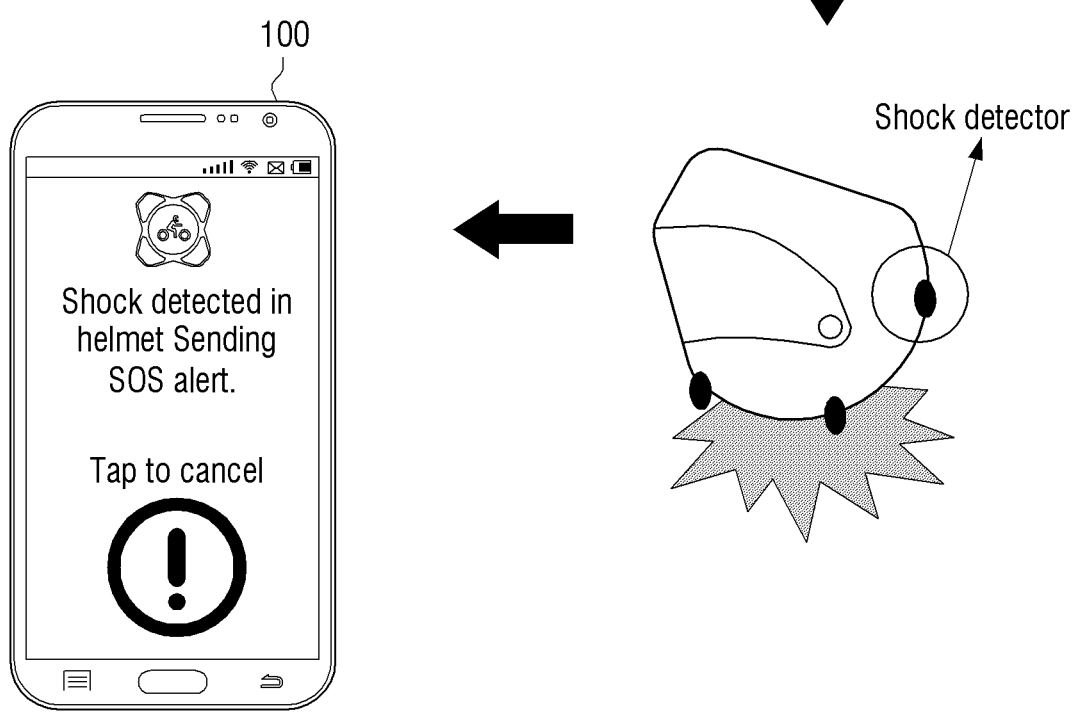

FIG. 22 shows an example in which the message is automatically sent to the contact associated with the user after determining the degree of resistance encountered on the smart helmet 1902, according to an exemplary embodiment. Initially, as shown in FIG. 22, the mobile device 100 is paired with the smart helmet 1902 of the user (i.e., the mobile device 100 pairs with the smart helmet 1902 having a shock detector or shock detectors when the motorcycle mode is enabled).

Further, as shown in FIG. 22, the mode controller 102 detects the degree of resistance encountered on the smart helmet 1902 (i.e., by detecting shock on the smart helmet 1902) worn by the user as the context of the motorcycle and the user. After detecting the degree of resistance, the message is automatically sent to the contact associated with the user. In an example, the message about the safety concern when the user does not cancel the alert in set time is sent to the caller in the priority list.

Figure 23:
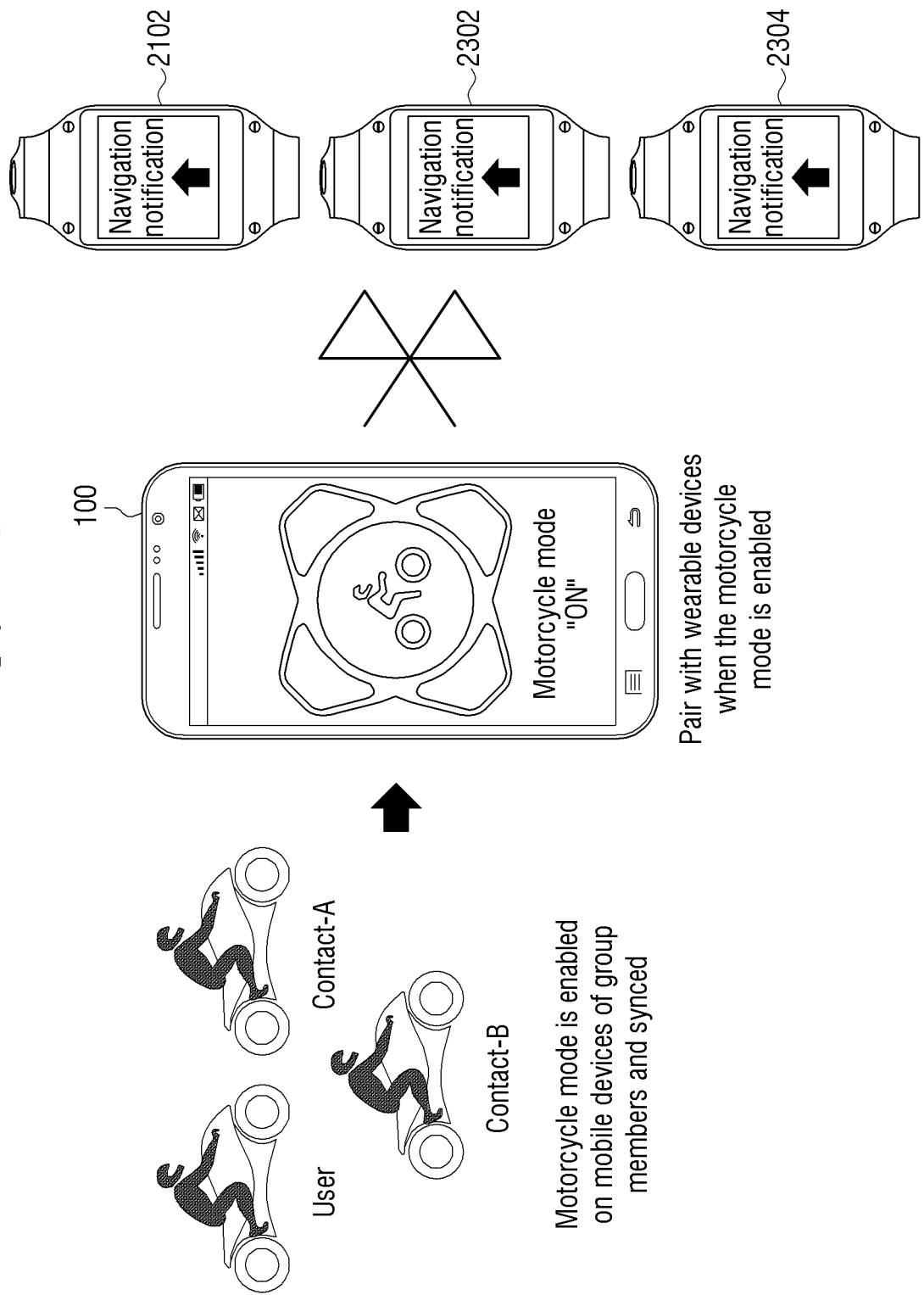
FIG. 23 shows an example in which a navigation notification is displayed on a screen of a wearable device, according to an exemplary embodiment.

FIG. 23 shows an example in which the navigation notification is displayed on the screen of the wearable device when the motorcycle mode is enabled and the user is riding the motorcycle, according to an exemplary embodiment. In an example, the user of the mobile device 100 is part of the motorcycle group members (i.e., the Contact-A and the Contact-B available in the mobile device 100) as shown in FIG. 23. Initially, the motorcycle mode is enabled in mobile devices (including the mobile device 100 of the user) of the motorcycle group members and synched with each other. The mobile device 100 is paired with wearable devices of the user and the motorcycle group members (i.e., the wearable device 2102 of the user, a wearable device 2302 of the Contact-A, and a wearable device 2304 of the Contact-B) through Bluetooth.

As shown in FIG. 23, the mode controller 102 determines the current location of the user riding the motorcycle as the context of the motorcycle and the user. The motorcycle mode controller 102 receives the current location of the contact-A (i.e., another user) riding another motorcycle. The motorcycle mode controller 102 causes to display the navigation notification on the screen of wearable devices (i.e., the wearable device 2102 of the user, a wearable device 2302 of the Contact-A, and a wearable device 2304 of the Contact-B as shown in FIG. 23) of the motorcycle group members indicating the current location of another user. The navigation notification may be displayed on the screen of the smart mirror.

Figure 24A:
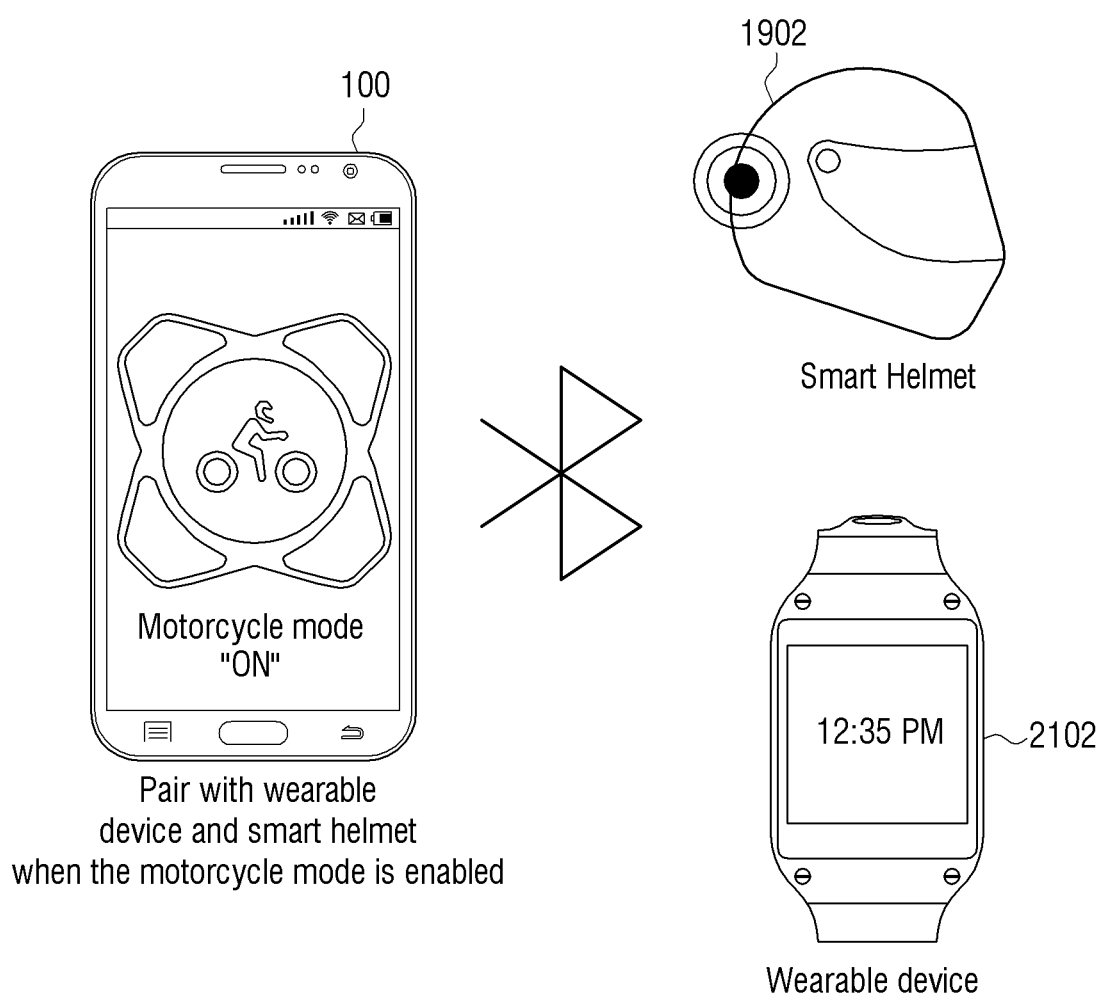
FIG. 24A shows an example in which a mobile device is paired with a smart helmet and a wearable device, according to an exemplary embodiment.

FIG. 24A shows an example in which the mobile device is paired with the smart helmet and the wearable device, according to an exemplary embodiment. Initially, as shown in FIG. 24A, the mobile device 100 is paired with the smart helmet 1902 and the wearable device 2102 of the user through Bluetooth.

Figure 24B:
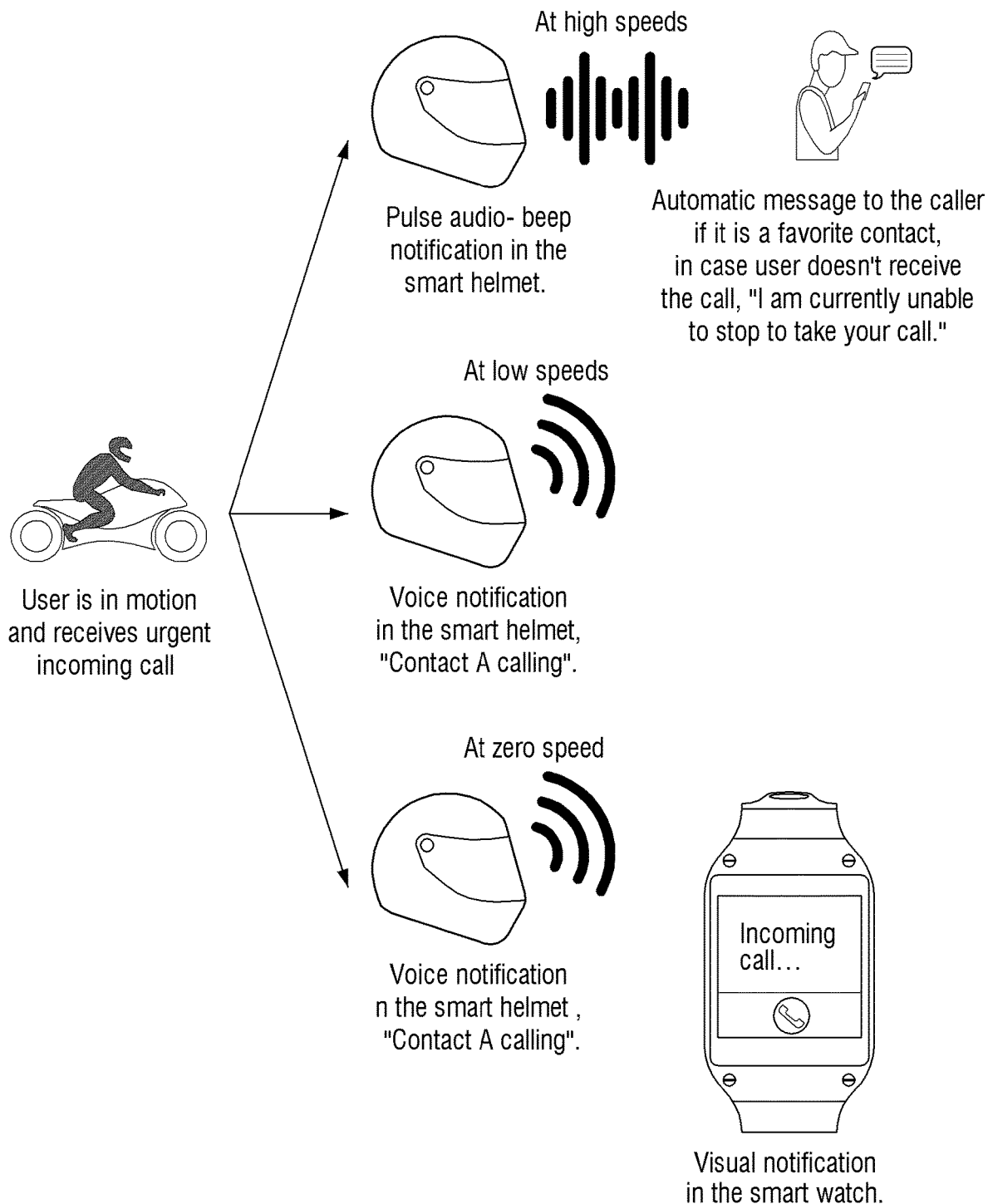
FIG. 24B shows an example in which an incoming call notification is elicited to a user based on a speed of a motorcycle, according to an exemplary embodiment.

FIG. 24B shows an example in which the incoming call notification is elicited to the user based on the speed of the motorcycle when the motorcycle mode is enabled, according to an exemplary embodiment.

At High Speed:

In an example, the user is in motion and receives the urgent incoming call while riding the motorcycle at high speed. In this scenario, the mode controller 102 elicits the incoming call notification (i.e., pulse audio-beep notification) through the smart helmet 1902 or sends the message "I am currently unable to stop to answer your call" of the user (i.e., if the caller is the priority caller).

At Low Speed:

In an example, the user is in motion and receives the urgent incoming call while riding the motorcycle at low speed. In this scenario, the mode controller 102 elicits the incoming call notification (i.e., voice notification "the Contact-A calling") through the smart helmet 1902 of the user.

At Zero Speed:

In an example, the user is in motion and receives the urgent incoming call while riding the motorcycle at zero speed. In this scenario, the mode controller 102 elicits the incoming call notification (i.e., voice notification "the Contact-A calling") through the smart helmet 1902 of the user or the visual notification through the wearable device 2102 of the user.

Figure 25:
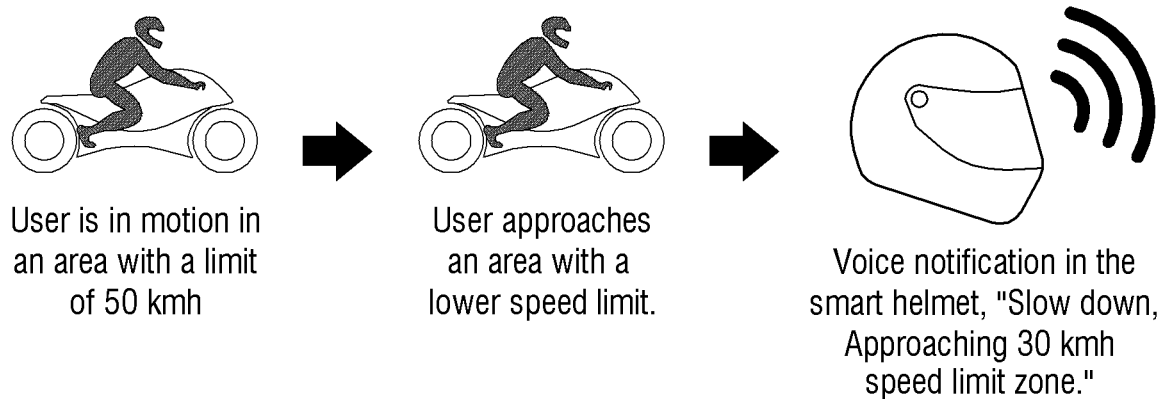
FIG. 25 shows an example in which a user is alerted to regulate a speed of a motorcycle, according to an exemplary embodiment.

FIG. 25 shows an example in which the user is alerted to regulate the speed of the motorcycle based on the location, according to an exemplary embodiment. The mode controller 102 detects the speed of the motorcycle as the context of the motorcycle and the user. Initially, in an example, the user is in motion in the location with a speed limit of 50 kph.

Further, the user approaches the current location with a lower speed limit (i.e., 30 kph). The mode controller 102 detects that the speed of exceeds the speed threshold (i.e., speed limit of the current location) based on the current location of the user. If the speed of the motorcycle exceeds the speed threshold, the motorcycle mode controller 102 alerts the user by sending the voice notification which is elicited through the smart helmet 1902 to regulate (i.e., slow down the motorcycle, approaching 30 kph speed limit zone) the speed of the motorcycle.

Figure 26:
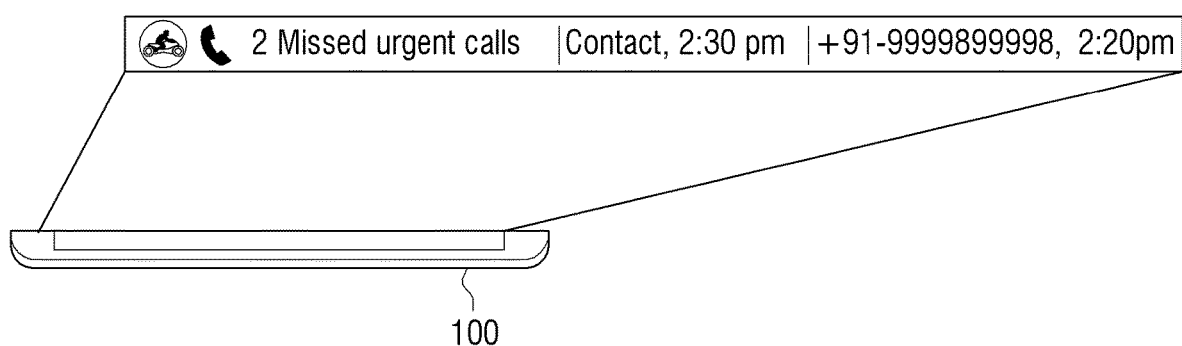
FIG. 26 shows an example in which missed call notifications are displayed on an edge area of a mobile device, according to an exemplary embodiment.

FIG. 26 shows an example in which the missed call notifications are displayed on an edge area of the mobile device 100, according to an exemplary embodiment. For example, the motorcycle mode is enabled and the user is riding the motorcycle. The user receives the incoming call from the caller while the user is riding the motorcycle. The mode controller 102 detects the speed of the motorcycle as the context of the motorcycle and the user; and detects that the speed of the motorcycle exceeds the speed threshold. Further, the mode controller 102 elicits the response message at the caller device indicating that the user is riding the motorcycle and the missed call notification is displayed on the edge of the mobile device 100 as shown in FIG. 26.

Figure 27:
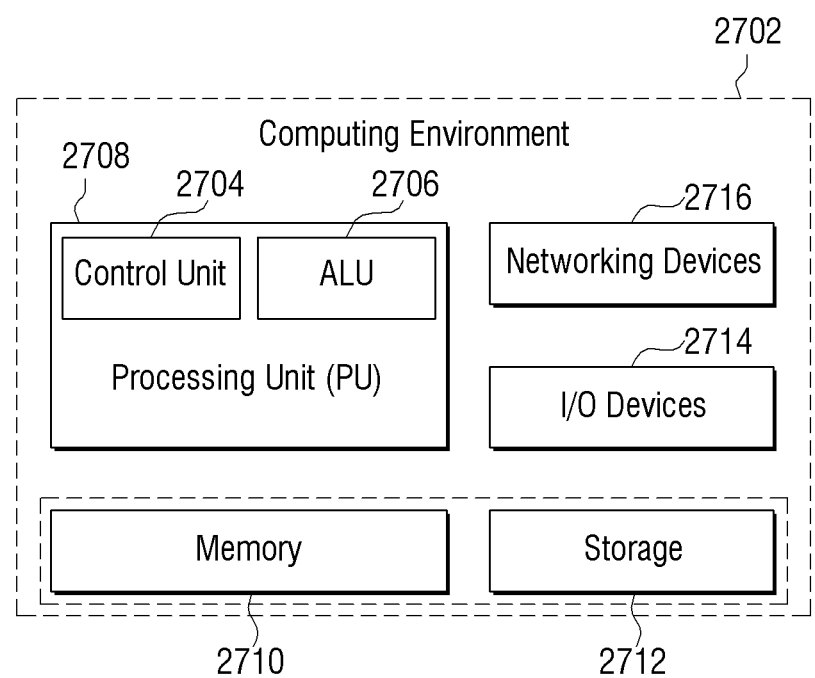
FIG. 27 illustrates a computing environment implementing the method for managing at least one operation of a mobile device while riding a motorcycle, according to exemplary embodiments.

FIG. 27 illustrates a computing environment implementing the method for managing the at least one operation of the mobile device while riding the motorcycle, according to exemplary embodiments. As depicted, the computing environment 2702 includes at least one processing unit 2708 that is equipped with a control unit 2704 and an Arithmetic Logic Unit (ALU) 2706, a memory 2710, a storage unit 2712, plurality of networking devices 2716 and a plurality Input output (I/O) devices 2714. The processing unit 2708 is responsible for processing the instructions for executing a method of an exemplary embodiment. The processing unit 2708 receives commands from the control unit in order to perform its processing. Further, any logical and arithmetic operations involved in the execution of the instructions are computed with the help of the ALU 2706.

The overall computing environment 2702 may be composed of multiple homogeneous and/or heterogeneous cores, multiple CPUs of different kinds, special media and other accelerators. The processing unit 2708 is responsible for processing the instructions for executing a method of an exemplary embodiment. Further, the plurality of processing units 2708 may be located on a single chip or over multiple chips.

The instructions and codes required for the implementation are stored in either the memory 2710 or the storage 2712 or both. At the time of execution, the instructions may be fetched from the corresponding memory 2710 or storage 2712, and executed by the processing unit 2708.

In case of any hardware implementations, various networking devices 2716 or external I/O devices 2714 may be connected to the computing environment to support the implementation through the networking unit and the I/O device unit.

The exemplary embodiments may be implemented through at least one software program running on at least one hardware device and performing network management functions to control the elements. The elements shown in the FIGS. 1 through 27 include blocks which may be at least one of a hardware device, or a combination of hardware device and software module.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method performed by an electronic device, the method comprising:
   providing, on a display of the electronic device, a user interface (UI) for enabling a ride mode of the electronic device, the ride mode comprising a plurality of functions performable in the ride mode;
   based on a user touch input on the UI, enabling the ride mode of the electronic device;
   receiving a call from another electronic device while the ride mode is enabled;
   based on the receiving the call, performing a first function among the plurality of functions in the ride mode, wherein the performing the first function comprises:
      automatically transmitting, to the other electronic device, a voice message which prompts a caller of the other electronic device to input a key if the call is urgent, and
      providing, on the display of the electronic device, a notification of an urgent call based on a signal indicating that the call is urgent being received from the other electronic device; and
   based on the urgent call being unanswered, performing a second function among the plurality of functions, wherein the performing the second function comprises:
      determining whether the call received from the other electronic device corresponds to a contact which is pre-selected from among a plurality of contacts stored in the electronic device, and
      automatically transmitting a text message including current location information of the electronic device to the other electronic device based on determining that the call corresponds to the pre-selected contact.

2. The method as claimed in claim 1, further comprising:
   sensing, by a sensor, a motion speed of the electronic device; and
   based on determining that the motion speed is equal to or greater than a threshold speed, enabling a lock-up mode of the electronic device.

3. The method as claimed in claim 2, wherein the providing the notification comprises:
   providing the notification in the lock-up mode which limits a touch input on the display of the electronic device while the notification is provided on the display of the electronic device.

4. The method as claimed in claim 3, further comprising:
   releasing the lock-up mode of the display, based on the motion speed of the electronic device becoming less than the threshold speed; and
   performing an operation related to the call, based on sensing a user command after the lock-up mode of the display is released.

5. The method as claimed in claim 3, further comprising:
   based on the motion speed being equal to or greater than the threshold speed, providing a notification indicating that accessing the electronic device through a user command is locked based on receiving the user command with respect to the call.

6. The method as claimed in claim 1, further comprising:
   based on the signal indicating that the call is urgent not being received from the other electronic device while the first function is performed, disconnecting the call without providing the notification related to the call.

7. The method as claimed in claim 1, wherein the automatically transmitting the text message further comprises:
   transmitting, to the other electronic device, the text message including the current location information and an estimated arrival time to destination of the electronic device.

8. The method as claimed in claim 1, wherein the providing the notification comprises:
   transmitting the notification to a helmet paired with the electronic device.

9. The method as claimed in claim 1, further comprising:
   based on a contact information of the other electronic device being absent in a priority list while the first function is performed, ending receipt of the call; and
   storing information of the call as a call history in a memory of the electronic device.

10. The method as claimed in claim 1, wherein the providing the notification comprises:
    determining a priority of the other electronic device based on at least one of contact information stored in the electronic device or a call history stored in a memory of the electronic device; and
    providing the notification related to the call to at least one external device paired with the electronic device based on the priority of the other electronic device.

11. The method as claimed in claim 1, the method further comprising:
    based on the call being not answered and based on not receiving the signal indicating that the call is urgent while the first function is performed, registering information of the call in a call history stored in a memory of the electronic device as a missed call of the ride mode; and
    based on the call being not answered and the signal indicating that the call is urgent being received from the other electronic device while the first function is performed, registering the information of the call in the call history as an urgent missed call of the ride mode.

12. The method as claimed in claim 1, wherein the enabling the ride mode of the electronic device comprises:
enabling the ride mode based on receiving a user command selecting an icon corresponding to the ride mode displayed on the UI.

13. The method as claimed in claim 1, wherein the pre-selected contact is selected based on a user command for selecting at least one contact from among the plurality of contacts stored in the electronic device.

14. An electronic device comprising:
a display;
a communication interface configured to receive a call from another electronic device; and
a processor configured to:
provide, on the display, a user interface (UI) for enabling a ride mode of the electronic device, the ride mode comprising a plurality of functions performable in the ride mode;
based on a user touch input on the UI, enable the ride mode of the electronic device;
based on receiving a call from the other electronic device, perform a first function among the plurality of functions in the ride mode by:
controlling the communication interface to automatically transmit, to the other electronic device, a voice message which prompts a caller of the other electronic device to input a key if the call is urgent, and
providing, on the display, a notification of an urgent call based on a signal indicating that the call is urgent being received from the other electronic device; and
based on the urgent call being unanswered, performing a second function among the plurality of functions in the ride mode by:
determining whether the call received from the other electronic device corresponds to a contact which is pre-selected from among a plurality of contacts stored in the electronic device, and
controlling the communication interface to automatically transmit, to the other electronic device, a text message including current location information of the electronic device based on determining that the call corresponds to the pre-selected contact.

15. The electronic device as claimed in claim 14, further comprising a sensor configured to sense a motion speed of the electronic device,
wherein the processor is further configured to control the sensor to sense the motion speed of the electronic device based on at least one of using a Global Positioning System (GPS) information or determining a speed of a motorcycle in which the electronic device is positioned.

16. The electronic device as claimed in claim 14, wherein the processor is further configured to disconnect the call based on not receiving the signal indicating that the call is urgent.

17. The electronic device as claimed in claim 14,
wherein the processor provides the notification in a lock-up mode of the display that is a mode which limits a touch input on the display while the notification is provided in the electronic device.

18. The electronic device as claimed in claim 17, wherein the processor is further configured to:
release the lock-up mode of the display if a motion speed of the electronic device is less than a threshold speed, and
perform an operation related to the call, based on a user command being input after the lock-up mode of the display is released.

19. The electronic device as claimed in claim 17, wherein the processor is further configured to transmit the notification to a helmet paired with the electronic device if a motion speed is equal to or greater than a threshold speed.

20. The electronic device as claimed in claim 17, wherein the processor is further configured to determine a priority of the other electronic device based on at least one of contact information stored in the electronic device or a call history stored in a memory of the electronic device, and control the communication interface to provide the notification to at least one external device paired with the electronic device, based on the priority of the other electronic device.

21. The electronic device as claimed in claim 14, wherein the processor is further configured to, based on the determining that the call corresponds to the pre-selected contact while the second function is performed, transmit, to the other electronic device, the text message including the current location information and estimated arrival time to destination of the electronic device.

22. The electronic device as claimed in claim 14, further comprising a memory,
wherein the processor is further configured to end receipt of the call based on a contact information of the other electronic device being absent in a priority list while the first function is performed, and control the memory to store information of the call.

23. The electronic device as claimed in claim 22, wherein the processor is further configured to:
based on the call being unanswered and based on not receiving the signal indicating that the call is urgent while the first function is performed, register the information of the call in a call history stored in the memory as a missed call of the ride mode, and
based on the call being unanswered and the signal indicating that the call is urgent being received while the first function is performed, register the information of the call in the call history as an urgent missed call of the ride mode.

* * * * *